United States Patent
Srinivasan

(10) Patent No.: US 6,651,247 B1
(45) Date of Patent: Nov. 18, 2003

(54) METHOD, APPARATUS, AND PRODUCT FOR OPTIMIZING COMPILER WITH ROTATING REGISTER ASSIGNMENT TO MODULO SCHEDULED CODE IN SSA FORM

(75) Inventor: Uma Srinivasan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/567,188

(22) Filed: May 9, 2000

(51) Int. Cl.[7] .................................. G06F 9/45
(52) U.S. Cl. ................. 717/161; 717/159; 717/152; 709/102; 712/226; 712/235; 712/241
(58) Field of Search .................. 717/149, 150, 717/159, 160, 161, 158, 151, 152; 712/226, 235, 241; 709/102

(56) References Cited

U.S. PATENT DOCUMENTS

| | | | |
|---|---|---|---|
| 5,339,419 A | 8/1994 | Chan et al. ................. | 395/700 |
| 5,386,570 A | 1/1995 | Lindhorst .................... | 395/700 |
| 5,511,198 A | 4/1996 | Hotta ......................... | 395/700 |
| 5,513,363 A | 4/1996 | Kumar et al. ............... | 395/800 |
| 5,555,417 A | 9/1996 | Odnert et al. .............. | 395/700 |
| 5,560,009 A | 9/1996 | Lenkov et al. ............. | 395/700 |
| 5,564,031 A | 10/1996 | Amerson et al. ........... | 395/419 |
| 5,615,369 A | 3/1997 | Holler ......................... | 395/709 |
| 5,867,711 A * | 2/1999 | Subramanian et al. ..... | 717/161 |
| 6,230,317 B1 * | 5/2001 | Wu ............................. | 717/158 |
| 6,249,910 B1 * | 6/2001 | Ju et al. ..................... | 717/161 |

OTHER PUBLICATIONS

Ron Cytron et al., "Efficiently Computing Static Single Assignment Form and the Control Dependence Graph", Oct. 1991, "ACM Transactions on Programming Languages and Systems", vol. 13, pp. 451–490.*

Cytron et al., "Efficiently Computing Static Single Assignment Form and the Control Dependence Graph" ACM Transactions on Programming Language and Systems, vol. 13, No. 4, Oct. 1991, pp. 451–490.

Dehnert and Towle, "Compiling for the Cydra 5" The Journal of Supercomputing 7, 1993, pp. 181–227.

Bacon et al., "Compiler Transformations for High–Performance Computing" (Draft), Computer Science Division, University of California, Berkeley, California, Nov. 2, 1993, pp. 1–78.

Wang et al., "Software Pipelining with Register Allocation and Spilling" ACM Transactions on Programming Language and Systems, Nov. 1994, pp. 95–99.

Ning and Gao, "A Novel Framework of Register Allocation for Software Pipelining" ACM Transactions on Programming Language and Systems, Jan. 1993, pp. 29–42.

Hopper, M.A., "Register Allocation" downloaded from http://www.ee.gatech.edu/users/mhopper/qual/qual_1html, Jan. 28, 1997 (27 pp).

Aho et al., "Compilers: Principles, Techniques, and Tools" Addison–Wesley Publishing Company, Reading, Massachusetts, 1986, pp. 1–22.

* cited by examiner

Primary Examiner—Tuan Q. Dam
Assistant Examiner—David A Snyder

(57) ABSTRACT

In a computer having rotating registers, a schedule-assigner for allocating the rotating registers. The scheduler-assigner includes a software-pipelined instruction scheduler that generates a first software-pipelined instruction schedule based on an intermediate representation that has data flow information in SSA form. The scheduler-assigner also includes a rotating register allocator that designates live ranges of loop-variant variables in the first software-pipelined instruction schedule as being allocated to rotating registers, when available. The first software-pipelined instruction schedule may be a modulo schedule. When a rotating register is not available, the software-pipelined instruction scheduler may generate a second software-pipelined instruction schedule having an initiation interval greater than the initiation interval of the first software-pipelined instruction schedule.

25 Claims, 9 Drawing Sheets

FIGURE 7A

| 210 Source Code Image | |
|---|---|
| 7A-1 | int i; |
| 7A-2 | int a[1000]; |
| 7A-3 | int b[1000]; |
| 7A-4 | int c, x=0 |
| 7A-5 | for (i=0; i < 1000; i++) |
| 7A-6 | { |
| 7A-7 | a[i] = b[i] + c; |
| 7A-8 | x = x + a[i]; |
| 7A-9 | } |
| 7A-10 | printf ("a[100], x = %d\n", a[100], x); |

FIGURE 7B

| 242 Low Level IR | |
|---|---|
| 7B-1 | L1: [basic block 1 code] |
| 7B-2 | L0: load SVGR1 = [SVGR0] |
| 7B-3 | mul SVGR3 = SVGR1 * SVGR2 |
| 7B-4 | add SVGR5 = SVGR4 + SVGR3 |
| 7B-5 | load SVGR6 = [SVGR5] |
| 7B-6 | load SVGR8 = [SVGR7] |
| 7B-7 | add SVGR9 = SVGR6 + SVGR8 |
| 7B-8 | mul SVGR11 = SVGR1 * SVGR10 |
| 7B-9 | add SVGR13 = SVGR11+ SVGR12 |
| 7B-10 | store [SVGR13] = SVGR9 |
| 7B-11 | load SVGR15 = [SVGR14] |
| 7B-12 | add SVGR16 = SVGR15 + SVGR9 |
| 7B-13 | store [SVGR14] = SVGR16 |
| 7B-14 | comp SVPR0 = SVGR1, 1000 |
| 7B-15 | <SVPR0> jump to L0 |

FIGURE 7C

| 312 Low Level IR with Control and Data Flow Information | |
|---|---|
| 7C-1 | L1: [basic block 1 code] |
| 7C-2 | L0: load SVGR1 = [SVGR0] |
| 7C-3 | mul SVGR3 = SVGR1 * SVGR2 |
| 7C-4 | add SVGR5 = SVGR4 + SVGR3 |
| 7C-5 | load SVGR6 = [SVGR5] |
| 7C-6 | load SVGR8 = [SVGR7] |
| 7C-7 | add SVGR9 = SVGR6 + SVGR8 |
| 7C-8 | mul SVGR11 = SVGR1 * SVGR10 |
| 7C-9 | add SVGR13 = SVGR11+ SVGR12 |
| 7C-10 | store [SVGR13] = SVGR9 |
| 7C-11 | load SVGR15 = [SVGR14] |
| 7C-12 | add SVGR16 = SVGR15 + SVGR9 |
| 7C-13 | store [SVGR14] = SVGR16 |
| 7C-14 | comp SVPR0 = SVGR1, 1000 |
| 7C-15 | <SVPR0> jump to L0 |

FIGURE 7D

| 322 Low Level Optimized IR | |
|---|---|
| 7D-1 | L0: phi SVGR17 = SVGR18, L1, SVGR19, L0 |
| 7D-2 | add SVGR19 = SVGR17 + SVGR20 |
| 7D-3 | load SVGR6 = [SVGR19] |
| 7D-4 | add SVGR9 = SVGR6 + SVGR8 |
| 7D-5 | phi SVGR21 = SVGR22, L1, SVGR23, L0 |
| 7D-6 | add SVGR23 = SVGR21 + SVGR24 |
| 7D-7 | store [SVGR23] = SVGR9 |
| 7D-8 | phi SVGR25 = SVGR26, L1, SVGR27, L0 |
| 7D-9 | add SVGR27 = SVGR25 + SVGR9 |
| 7D-10 | conditional jump to L0 |

FIGURE 8A

| | 412 List Scheduled IR with Control and Data Flow Information | | |
|---|---|---|---|
| C # | Slot #1 | Slot #2 | Slot #3 |
| 8A-0 | [1] phi SVGR17 = SVGR18, L1, SVGR19, L0 | [5] phi SVGR21 = SVGR22, L1, SVGR23, L0 | [8] phi SVGR25 = SVGR26, L1, SVGR27, L0 |
| 8A-1 | [2] add SVGR19 = SVGR17 + SVGR20 | [6] add SVGR23 = SVGR21 + SVGR24 | NOP |
| 8A-2 | [3] load SVGR6 = [SVGR19] | NOP | NOP |
| 8A-3 | NOP | NOP | NOP |
| 8A-4 | [4] add SVGR9 = SVGR6 + SVGR8 | NOP | NOP |
| 8A-5 | [7] store [SVGR23] = SVGR9 | [9] add SVGR27 = SVGR25 + SVGR9 | [10] conditional jump to L0 |

FIGURE 8B

| | 612 Modulo Scheduled IR | | | |
|---|---|---|---|---|
| C # | Slot #1 | Slot #2 | Slot #3 | Slot #4 |
| 8B-0 | [1] phi SVGR17=SVGR18, L1, SVGR19, L0 | [5] phi SVGR21=SVGR22, L1, SVGR23, L0 | [8] phi SVGR25=SVGR26, L1, SVGR27, L0 | |
| 8B-1 | [2] <RVPR1> add SVGR19 = SVGR17 + SVGR20 | [6] <RVPR1> add SVGR23 = SVGR21 + SVGR24 | [7] <RVPR3> store [SVGR23] = SVGR9 | [9] <RVPR3> add SVGR27 = SVGR25 + SVGR9 |
| 8B-2 | [3] <RVPR1> load SVGR6 = [SVGR19] | [4] <RVPR2> add SVGR9 = SVGR6 + SVGR8 | [10] conditional jump to L0 | NOP |

FIGURE 8C

| | 622 Rotating-Register Assigned IR | | | |
|---|---|---|---|---|
| C # | Slot #1 | Slot #2 | Slot #3 | Slot #4 |
| 8C-0 | [1] phi SVGR17 = SVGR18, L1, SVGR19, L0 | [5] phi RRGR5 = RRGR6, L1, RRGR6, L0 | [8] phi SVGR25=SVGR26, L1, SVGR27, L0 | |
| 8C-1 | [2] <RRPR1> add SVGR19 = SVGR17 + SVGR20 | [6] <RRPR1> add RRGR5 = RRGR5 + SVGR24 | [7] <RRPR3> store [RRGR7] = RRGR4 | [9] <RRPR3> add SVGR27 = RRGR4 + SVGR25 |
| 8C-2 | [3] <RRPR1> load RRGR1 = [SVGR19] | [4] <RRPR2> add RRGR3 = RRGR2 + SVGR8 | [10] conditional jump to L0 | NOP |

FIGURE 9A

| | 546 SSA-Updated IR | | | |
|---|---|---|---|---|
| C # | Slot #1 | Slot #2 | Slot #3 | Slot #4 |
| 9A-0 | [1] phi SVGR17 = SVGR18, L1, SVGR19, L0 | [8] phi SVGR25 = SVGR26, L1, SVGR27, L0 | | |
| 9A-1 | [2] <RRPR1> add SVGR19 = SVGR17 + SVGR20 | [6] <RRPR1> add RRGR5 = RRGR6 + SVGR24 | [7] <RRPR3> store [RRGR7] = RRGR4 | [9] <RRPR3> add SVGR27 = RRGR4 + SVGR2 |
| 9A-2 | [3] <RRPR1> load RRGR1 = [SVGR19] | [4] <RRPR2> add RRGR3 = RRGR2 + SVGR8 | [10] conditional jump to L0 | NOP |

FIGURE 9B

| | 548 SSA-Discarded IR | | | |
|---|---|---|---|---|
| C # | Slot #1 | Slot #2 | Slot #3 | Slot #4 |
| 9B-1 | [2] <RRPR1> add SVGR17 = SVGR17 + SVGR20 | [6] <RRPR1> add RRGR5 = RRGR6 + SVGR24 | [7] <RRPR3> store [RRGR7] = RRGR4 | [9] <RRPR3> add SVGR25 = RRGR4 + SVGR25 |
| 9B-2 | [3] <RRPR1> load RRGR1 = [SVGR17] | [4] <RRPR2> add RRGR3 = RRGR2 + SVGR8 | [10] conditional jump to L0 | NOP |

FIGURE 9C

| | 552 Static-Register Assigned IR | | | |
|---|---|---|---|---|
| C # | Slot #1 | Slot #2 | Slot #3 | Slot #4 |
| 9C-1 | [2] <RRPR1> add SRGR1 = SRGR1 + SRGR2 | [6] <RRPR1> add RRGR5 = RRGR6 + SRGR3 | [7] <RRPR3> store [RRGR7] = RRGR4 | [9] <RRPR3> add SRGR4 = RRGR4 + SRGR4 |
| 9C-2 | [3] <RRPR1> load RRGR1 = [SRGR1] | [4] <RRPR2> add RRGR3 = RRGR2 + SRGR5 | [10] conditional jump to L0 | NOP |

METHOD, APPARATUS, AND PRODUCT FOR OPTIMIZING COMPILER WITH ROTATING REGISTER ASSIGNMENT TO MODULO SCHEDULED CODE IN SSA FORM

BACKGROUND

1. Field of the Invention

The invention generally relates to methods and devices for optimizing computer register allocation and assignment, particularly as implemented in an optimizing compiler using instruction level scheduling.

2. Related Art

A compiler is a computer program that transforms a source computer program written in one language, such as Fortran, or C, into a target computer program that has the same meaning but is written in another language, such as an assembler or machine language. A compiler's tasks may be divided into an analysis stage followed by a synthesis stage, as explained in *Compilers: Principles, Techniques, and Tools* by A. Aho et al. (Addison Wesley, 1988) pp. 2–22. The product of the analysis stage may be thought of as an intermediate representation of the source program; i.e., a representation in which lexical, syntactic, and semantic evaluations and transformations have been performed to make the source code easier to synthesize. The synthesis stage may be considered to consist of two tasks: code optimization, in which the goal is generally to increase the speed at which the target program will run on the computer, or possibly to decrease the amount of resources required to run the target program; and code generation, in which the goal is to actually generate the target code, typically relocatable machine code or assembly code.

A compiler that is particularly well suited to one or more aspects of the code optimization task may be referred to as an "optimizing compiler." Optimizing compilers are of increasing importance for several reasons. First, the work of an optimizing compiler frees programmers from undue concerns regarding the efficiency of the high-level programming code that they write. Instead, the programmers can focus on high-level program constructs and on ensuring that errors in program design or implementation are avoided. Second, designers of computers that are to employ optimizing compilers can configure hardware based on parameters dictated by the optimization process rather than by the non-optimized output of a compiled high-level language. Third, increased use of microprocessors that are designed for instruction level parallel processing, such as RISC and VLIW microprocessors, presents new opportunities to exploit this processing through a balancing of instruction level scheduling and register allocation.

There are various strategies that an optimizing compiler may pursue. Many of them are described in S. Muchnick, *Advanced Compiler Design and Implementation* (Morgan Kaufmann Publishers, 1997). One large group of these strategies focus on optimizing transformations, such as are described in D. Bacon et al., "Compiler Transformations for High-Performance Computing," in *ACM Computing Surveys*, Vol. 26, No. 4 (December 1994) at pp. 345–520. These transformations often involve high-level, machine-independent, programming operations: for example, removing redundant operations, simplifying arithmetic expressions, removing code that will never be executed, removing invariant computations from loops, and storing values of common sub-expressions rather than repeatedly computing them. These machine-independent transformations are hereafter referred to as high level optimizations.

Other strategies employ machine-dependent transformations. These machine-dependent transformations are hereafter referred to as low level optimizations. Two important types of low level optimizations are: (a) instruction scheduling and (b) register allocation. An important portion of both types of low level optimization strategies are focused on loops in the code, where in many applications the majority of execution time is spent.

A principal goal of some instruction scheduling strategies is to permit two or more operations within a loop to be executed in parallel, a process referred to as instruction level parallel (ILP) processing. ILP processing generally is implemented in processors with multiple execution units. One way of communicating with the central processing unit (CPU) of the computer system is to create "very long instruction words" (VLIW's). VLIW's specify the multiple operations that are to be executed in a single machine cycle. For example, a VLIW may instruct one execution unit to begin a memory load and a second to begin a memory store, while a third execution unit is processing a floating point multiplication. Each of these execution tasks has a latency period; i.e., the task may take one, two, or more cycles to complete. The objective of ILP processing is thus to optimize the use of the execution units by minimizing the instances in which an execution unit is idle during an execution cycle. ILP processing may be implemented by the CPU or, alternatively, by an optimizing compiler. Utilizing CPU hardware, however, may be complex and result in an approach that is not as easy to change or update as the use of an appropriately designed optimizing compiler.

One known technique for improving instruction level parallelism in loops is referred to as software pipelining. As described in the work by D. Bacon et al. referred to above, the operations of a single loop iteration are separated into s stages. After transformation, which may require the insertion of startup code to fill the pipeline for the first s–1 iterations and cleanup ode to drain it for the last s–1 iterations, a single iteration of the transformed code will perform stage 1 from pre-transformation iteration i, stage 2 from pre-transformation iteration i-l, and so on. This single iteration is known as the kernel of the transformed code. A particular known class of algorithms for achieving software pipelining is referred to as modulo scheduling, as described in James C. Dehnert and Ross A. Towle, "Compiling for the Cydra 5," in *The Journal of Supercomputing*, vol. 7, pp. 181, 190–197 (1993; Kluwer Academic Publishers).

Typically, the application of an instruction scheduling algorithm depends on information provided by a dependence graph (as well as information about the machine on which the instructions will be executed). As is known to those skilled in the art, the dependence graph represents source program dependencies at the machine instruction level. The construction of the dependence graph is based upon general data flow information that may be computed and maintained across several optimization phases. There are several alternative forms of data flow representation described in the literature, and a typical optimizer may choose to use any one or more of these. Among them are so-called "def-use" (definition-use) chains, static single assignment (SSA) form, and dynamic single assignment (DSA) form. From the instruction scheduling point of view, the fewer dependencies there are in the dependence graph, the more freedom the scheduler has to achieve higher degrees of ILP. Some forms of data flow representation (such as SSA) enable more accurate and more resource-efficient construction of instruction dependence graphs than others.

As noted, another group of low level optimization strategies involves register allocation and assignment. Some of these strategies have as their goal improved allocation and assignment of registers used in performing loop operations. The allocation of registers generally involves the selection of variables to be stored in registers during certain portions of the compiled computer program. The subsequent step of assignment of registers involves the choosing of specific registers in which to place the variables. The term "variable" will generally be understood to refer to a quantity that has a "live range" during the portion of the computer program under consideration. Specifically, a variable has a live range at a particular point in the computer program if that point may be included in a control path having a preceding point at which the variable is defined and a subsequent point at which the variable is used. Thus, register allocation may be described as referring to the selection of live ranges to be stored in registers, and register assignment as the assignment of a specific physical register to one of the live ranges previously allocated for these assignments.

Registers are high-speed memory locations in the CPU generally used to store the value of variables. They are a high-value resource because they may be read from or written to very quickly. Typically, at least two registers can be read and a third written within a single machine cycle. In comparison, a single access to random access memory (RAM) may require several cycles to complete. Registers typically are also a relatively scarce resource. In comparison to the large number of words of RAM addressable by the CPU, typically numbered in the tens or hundreds of millions and requiring tens of bits to address, the number of registers will often be on the order of ten or a hundred and therefore require only a small number of bits to address. Because of their high value in terms of speed, the decisions of how many and which kind of registers to assign may be the most important decisions in determining how quickly the program will run. For example, a decision to assign a frequently used variable to a register may eliminate a multitude of time-consuming reads and writes of that variable from and to memory. This assignment decision often will be the responsibility of an optimizing compiler.

Register allocation and assignment are particularly difficult problems, however, when combined with the goal of minimizing the idle time of multiple execution units using instruction level scheduling. In particular, there is the well known problem, sometimes referred to as "phase ordering," of which task should be performed first. In order to provide full freedom to the instruction scheduler to achieve a high degree of ILP, it is better to perform instruction scheduling before register allocation. However, having an insufficient number of registers to perform all the operations would cause the register allocator/assigner to insert "spill" instructions to spill one or more registers. That is, the contents of the spilled registers are temporarily moved to RAM to provide registers for the remaining operations that must be performed, and loaded back again into registers when required for subsequent operations. In order to schedule these spill instructions, the instruction scheduler must execute after the register allocator. Typically, compilers overcome this problem by executing the instruction scheduler twice: once before the register allocator/assigner executes, and once after.

Modulo scheduling and rotating register allocation/assignment introduce additional considerations into this already complex situation. Typically, modulo scheduling is performed as part of the instruction-scheduling phase before general register allocation/assignment in order to exploit more instruction level parallelism, as mentioned above. One would be able arrive at the exact register requirements (rotating or static) for a loop only after a modulo schedule is determined. It is quite possible, however, that after a modulo schedule is determined, the register allocator/assigner may determine that spill code must be inserted due to an insufficient number of registers.

One attempt to address this problem is described in Q. Ning and Guang R. Gao, "A Novel Framework of Register Allocation for Software Pipelining," in *Proceedings of the SIGPLAN'93 Conference on POPL* (1993) at pp. 29–42. The method described in that article (hereafter, the "Ning-Gao method") makes use of register allocation as a constraint on the software pipelining process. The Ning-Gao method generally consists of determining time-optimal schedules for a loop using an integer linear programming technique and then choosing the schedule that imposes the least restrictions on the use of registers. One disadvantage of this method, however, is that it is quite complex and may thus significantly contribute to the time required for the compiler to compile a source program. Another significant disadvantage of the Ning-Gao method is that it does not address the need for, or impact of, inserting spill code. That is, the method assumes that the minimum-restriction criterion for register usage can be met because there will always be a sufficient number of available registers. However, this is not always a realistic assumption as applied to production compilers. (A production compiler is one intended for commercial production, as contrasted, for example, with a research compiler for experimental use.)

Another known method that attempts to provide for loop scheduling and register allocation while taking into account the potential need for inserting spill code is described in Jian Wang, et al., "Software Pipelining with Register Allocation and Spilling," in *Proceedings of the MICRO-27*," (1994) at pp. 95–99. The method described in this article (hereafter, the "Wang method") generally assumes that all spill code for a loop to be software pipelined is generated during instruction-level scheduling. Thus, the Wang method requires assumptions about the number of registers that will be available for assignment to the operations within the loop after taking into account the demand on register usage imposed by live ranges in the subprogram outside of the loop. These assumptions may, however, prove to be inaccurate, thus requiring either unnecessarily conservative assumptions to avoid this possibility, repetitive loop scheduling and register allocation, or other variations on the method.

Thus, a better method and system are needed for performing loop instruction scheduling and register allocation/assignment. This improved method and system should be capable of generating schedules with high degrees of instruction level parallelism. They should take into account practical constraints on the number of available registers and thus the potential need to insert spill code. However, the need to insert spill code should be minimized. The improved method and system should be efficient in terms of resource consumption (memory usage and compile time) for incorporation into production compilers.

SUMMARY OF THE INVENTION

The foregoing and other objects, features, and advantages are achieved in a system, method, and product for instruction scheduling and register allocation/assignment in an optimizing compiler. In one aspect of the invention, a scheduler-assigner for allocating rotating registers is disclosed. The scheduler-assigner is used in a computer with a memory unit, in which is stored a first intermediate representation (first IR) of source code. The first IR has data flow information in SSA form.

The scheduler-assigner includes a software-pipelined instruction scheduler that generates a first software-pipelined instruction schedule based on the first IR. The scheduler-assigner also includes a rotating register allocator that designates live ranges of loop-variant variables in the first software-pipelined instruction schedule as being allocated to rotating registers, when available. If a live range is exposed, the rotating register allocator may determine that none of the rotating registers should be designated as allocated to the exposed live range.

The first software-pipelined instruction schedule may be a modulo schedule. When a rotating register is not available, the software-pipelined instruction scheduler may generate a second software-pipelined instruction schedule having an initiation interval greater than the initiation interval of the first software-pipelined instruction schedule. In this case, the rotating register allocator may designate live ranges of loop-variant variables in the second software-pipelined instruction schedule as being allocated to rotating registers, when available. If rotating registers are not available for all these live ranges, the process may be repeated one or more times. For example, the software-pipelined instruction scheduler may generate a third software-pipelined instruction schedule having an initiation interval greater than the initiation interval of the second software-pipelined instruction schedule.

The scheduler-assigner may also include a modulo schedule code generator that generates, based on the designations of the live ranges as being allocated to the rotating registers, a rotating register assigned intermediate representation that includes an assignment of the rotating registers to the live ranges. The modulo schedule code generator includes a software-pipelined instruction-schedule code inserter that generates from the first IR a software-pipelined IR having one or more instructions that are software-pipelined based on the first software-pipelined instruction schedule. The modulo schedule code generator also includes a rotating register assigner that assigns the first rotating register in the software-pipelined IR to the first live range, thereby generating a rotating-register assigned IR. The assignment is based upon the designation of the first live range as being allocated to the first rotating register.

The rotating-register assigned IR may have one or more phi functions including a first phi function having an operand to which the rotating register assigner has assigned the first rotating register. The modulo schedule code generator includes an SSA updater that propagates the first rotating register to at least one use of the operand, thereby generating a data-flow updated IR. When the first rotating register has been propagated to at least one use of the operand, the SSA updater removes the first phi function from the data-flow updated IR, thereby generating an SSA-updated IR.

The scheduler-assigner may have an SSA discarder that eliminates data flow information from the SSA-updated IR, thereby generating an SSA-discarded IR. In some implementations, the SSA discarder eliminates the data flow information using a sibling relationship technique. In some implementations, the computer as static registers and the SSA-discarded IR includes one or more static virtual registers. In these implementations, the scheduler-assigner may include a static register assigner and memory spiller that assigns a first static register, when available, to replace a first of the one or more static virtual registers, thereby generating a static-register assigned IR. When the first static register is not available, the static register assigner and memory spiller inserts in the static-register assigned IR one or more spill code instructions for a live range corresponding to the first static virtual register. The scheduler-assigner may further include a machine code generator that transforms the static-register assigned IR into a set of machine code instructions suitable for execution by the computer's processor.

In some aspects of the invention, a method for allocating rotating registers is described. The method includes the steps of: (a) generating a first software-pipelined instruction schedule based on a first IR of source code; and (b) designating live ranges of a loop-variant variables in the first software-pipelined instruction schedule as being allocated to rotating registers. The first IR includes data flow information in SSA form. The first software-pipelined instruction schedule may be a modulo schedule.

In some implementations of the method, step (b) includes, if a rotating register is not available for having a live range designated to it, generating a second software-pipelined instruction schedule having an initiation interval greater than the initiation interval of the first software-pipelined instruction schedule. Live ranges of a loop-variant variable in the second software-pipelined instruction schedule may be designated as being allocated to the first rotating register, when available. If rotating registers are not available for all these live ranges, the method includes generating a third software-pipelined instruction schedule having an initiation interval greater than the initiation interval of the second software-pipelined instruction schedule. These steps of generating software-pipelined instruction schedules with increasing initiation intervals, and attempting to designate all live ranges as being allocated to rotating registers, may continue to be repeated to find a schedule such that a sufficient number of rotating registers are available. In some aspects, step (a) includes, when a rotating register is not available for having a live range designated to it, (i), inserting one or more spill code instructions in the first IR for the live range, and (ii) generating another software-pipelined instruction schedule based on the first IR including the spill code instructions.

The method may also have a step(c) of generating, based on the software-pipelined instruction schedule and the designation of live ranges as being allocated to rotating registers, a rotating register assigned IR that includes an assignment of the rotating registers to the live ranges. In some implementations, this step (c) includes (i) generating from the first IR a software-pipelined IR having one or more instructions that are software-pipelined based on the first software-pipelined instruction schedule, and (ii) assigning the rotating registers in the software-pipelined IR to the live ranges, thereby generating a rotating-register assigned IR, wherein the assignment is based upon the designation of the live ranges as being allocated to the rotating registers.

The rotating-register assigned IR generated in accordance with this method may have one or more phi functions including a first phi function having an operand to which a first rotating register has been assigned. In this implementation, step (c) of the method further includes (iii) propagating the first rotating register to at least one use of the operand, thereby generating a data-flow updated IR. When the first rotating register has been propagated to at least one use of the operand, step (c) (iii) further includes the step of removing the first phi function from the data-flow updated IR, thereby generating an SSA-updated IR. Another step in the method may be (d) eliminating data flow information from the SSA-updated IR.

In yet other aspects of the invention, an optimizing compiler is described. The compiler is for use in a computer that has rotating registers. The compiler includes a front end processor that applies high-level, machine independent, optimizing transformations to a source code image, thereby generating a low level intermediate representation (low level IR) of the source code. The compiler also includes a low-level code optimizer that has a control and data flow information generator that generates a low level IR with control and data flow information. The data flow information is based upon data flow in the low level IR, and is in SSA form. Also included in the compiler is a global and loop optimizer that applies global, low level optimization techniques to the low level IR with control and data flow information, thereby generating a low-level optimized IR. A global scheduler then applies instruction scheduling techniques to the low-level optimized IR, thereby generating a list scheduled IR with control and data flow information (list-scheduled IR). Also included in the compiler is a scheduler-assigner that allocates rotating registers. The scheduler-assigner includes a software-pipelined instruction scheduler that generates a first software-pipelined instruction schedule based on the list scheduled IR, and a rotating register allocator that designates live ranges of loop-variant variables in the first software-pipelined instruction schedule as being allocated to rotating registers. The first software-pipelined instruction schedule may be a modulo schedule.

In a further aspect of the invention, a computer system is described. The computer system has a processor, one or more rotating registers, and a memory unit having stored therein a first intermediate representation (first IR) of source code and a set of scheduling-assignment instructions for execution by the processor. The first IR includes data flow information in SSA form. The set of scheduling-assignment instructions includes a set of software-pipelined instruction scheduler instructions that generate a first software-pipelined instruction schedule based on the first IR. The set of scheduling-assignment instructions also includes a set of rotating register allocator instructions that designate live ranges of a loop-variant variables in the first software-pipelined instruction schedule as being allocated to rotating registers. The first software-pipelined instruction schedule may be a modulo schedule.

Storage media are described in another aspect of the invention. The storage media contain software that, when executed on a computing system, performs a method for allocating rotating registers. The method includes the steps of: (a) generating a software-pipelined instruction schedule based on a first intermediate representation (first IR) of source code stored in a memory unit of the computer; and (b) designating live ranges of loop-variant variables in the software-pipelined instruction schedule as being allocated to rotating registers. The first IR includes data flow information in SSA form. The software-pipelined instruction schedule may be a modulo schedule.

The above aspects and implementations of the invention are not necessarily inclusive or exclusive of each other and may be combined in any manner that is non-conflicting and otherwise possible, whether they be presented in association with a same, or a different, aspect or implementation of the invention. The description of one aspect is not intended to be limiting with respect to other aspects. Also, any one or more function, step, operation, or technique described elsewhere in this specification may, in alternative aspects, be combined with any one or more function, step, operation, or technique described in the summary. Thus, the above aspects are illustrative rather than limiting.

BRIEF DESCRIPTION OF THE DRAWINGS

The above and further advantages of the invention will be more clearly appreciated from the following detailed description when taken in conjunction with the accompanying drawings. In the drawings, like reference numerals indicate like structures or method steps, and the leftmost one digit of a reference numeral indicates the number of the figure in which the referenced element first appears (for example, the element 210 appears first in FIG. 2). Solid lines generally indicate control flow, and dotted lines generally indicate data flow. Rectangles generally indicate functional elements; parallelograms generally indicate representations of computer code; and rectangles with curved bottoms indicate data. In the drawings:

FIG. 7A is a representation of a fragment of a source code image suitable for processing by the optimizing compiler of FIG. 2;

FIG. 7B is a representation of a low level intermediate representation of the source code image of FIG. 7A as generated by one embodiment of a front end processor of the optimizing compiler of FIG. 2;

FIG. 7C is a representation of a low level intermediate representation with control and data flow information of the source code image of FIG. 7A as generated by one embodiment of a control and data flow information generator of the low level code optimizer of FIG. 3;

FIG. 7D is a representation of a low level optimized intermediate representation of the source code image of FIG. 7A as generated by one embodiment of a global and loop optimizer of the low level code optimizer of FIG. 3;

FIG. 8A is a representation of a list scheduled intermediate representation with control and data flow information of the source code image of FIG. 7A as generated by one embodiment of a global scheduler of the scheduler and register allocator of FIG. 4;

FIG. 8B is a representation of a modulo scheduled intermediate representation of the list scheduled intermediate representation with control and data flow information of FIG. 8A as generated by one embodiment of a modulo scheduled code inserter of the modulo schedule code generator of FIG. 6;

FIG. 8C is a representation of a rotating-register assigned intermediate representation of the modulo scheduled intermediate representation of FIG. 8B as generated by one embodiment of an intermediate representation rotating register assigner of the modulo schedule code generator of FIG. 6;

FIG. 9A is a representation of an SSA-updated intermediate representation of the rotating-register assigned intermediate representation of FIG. 8C as generated by one embodiment of an SSA updater of the modulo schedule code generator of FIG. 6;

FIG. 9B is a representation of an SSA-discarded intermediate representation of the SSA-updated intermediate representation of FIG. 9B as generated by one embodiment of an SSA discarder of the modulo scheduler and register allocator of FIG. 5; and FIG. 9C is a representation of a static-register assigned intermediate representation of the SSA-discarded intermediate representation of FIG. 9B as generated by one embodiment of a static register allocator and memory spiller of the modulo scheduler and register allocator of FIG. 5.

DETAILED DESCRIPTION

Figure 4:
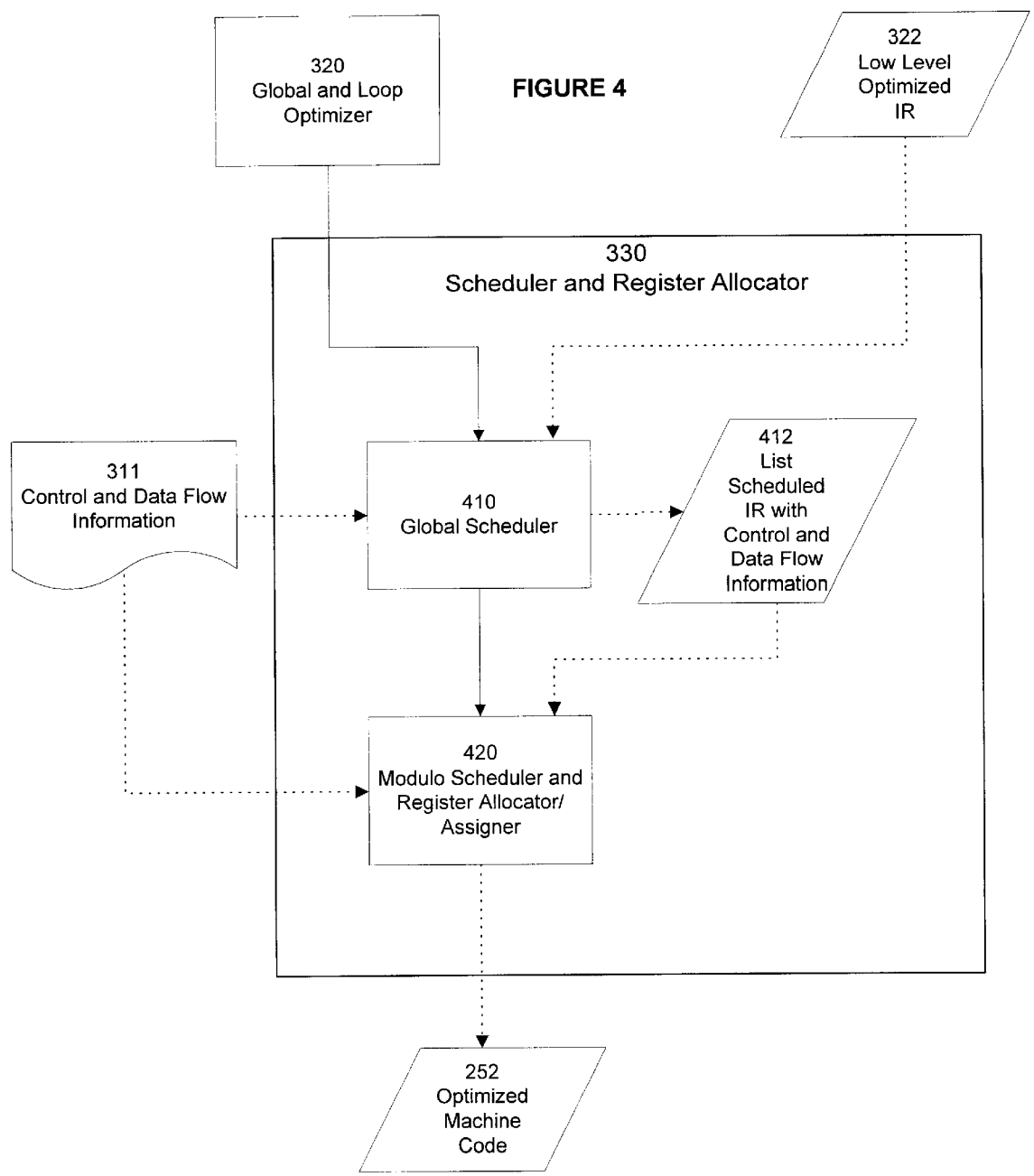
FIG. 4 is a functional block diagram of one embodiment of a scheduler and register allocator of the low level code optimizer of FIG. 3.

The attributes of the present invention and its underlying method and architecture will now be described in greater detail with reference to modulo scheduler and register allocator/assigner 420 (for convenience, "scheduler-assigner 420") of FIG. 4. Scheduler-assigner 420, in the illustrated embodiment, operates as an element of optimizing compiler 100 of FIG. 1 and 2.

Various functional elements of the present invention are described that may be implemented either in software, hardware, firmware, or any combination thereof. For convenience of illustration, descriptions generally are made with respect to implementations in software. These descriptions therefore typically refer to software-implemented functional elements that will be understood to comprise sets of software instructions that cause described functions to be performed. Similarly, in a software implementation, scheduler-assigner 420 may be referred to as "a set of scheduling-assignment instructions for an optimizing compiler."

It will be understood by those skilled in the relevant art that the functions ascribed to scheduler-assigner 420, or any of its functional elements, typically are performed by the CPU of the computer system executing these software instructions, typically in cooperation with the operating system of the computer system. More generally, it will be understood that functions performed by the invention, whether implemented in software, hardware, firmware, or any combination thereof, typically are performed by the CPU in cooperation with the operating system, or by a special purpose processor. Henceforth, the fact of this cooperation among the CPU and operating system (or a special purpose processor), and the elements of the invention, whether implemented in software, hardware, firmware, or any combination thereof, may therefore not be repeated or further described, but will be understood to be implied. In particular, the cooperative functions of the operating system, which are well known to those skilled in the relevant art, are omitted for clarity.

It will also be understood by those skilled in the relevant art that the functions ascribed to scheduler-assigner 420 and its functional elements, whether implemented in software, hardware, firmware, or any combination thereof, may in some embodiments be included in the functions of the operating system. That is, for example, operating system 120 of FIG. 1 may include scheduler-assigner 420. In these embodiments, the functions of scheduler-assigner 420 may be described with reference to the execution by the CPU (e.g., processor 105 of FIG. 1) of a set of scheduling-allocation instructions, but without reference to cooperation with a separate operating system. In these embodiments, the functions ascribed to scheduler-assigner 420, or any of its functional elements, typically are performed by the CPU executing these software instructions in cooperation with aspects of operating system 120 other than scheduler-assigner 420. Therefore, in these embodiments, cooperation by scheduler-assigner 420 with aspects of an operating system may not be stated, but will be understood to be implied.

COMPUTER 110

Figure 1:
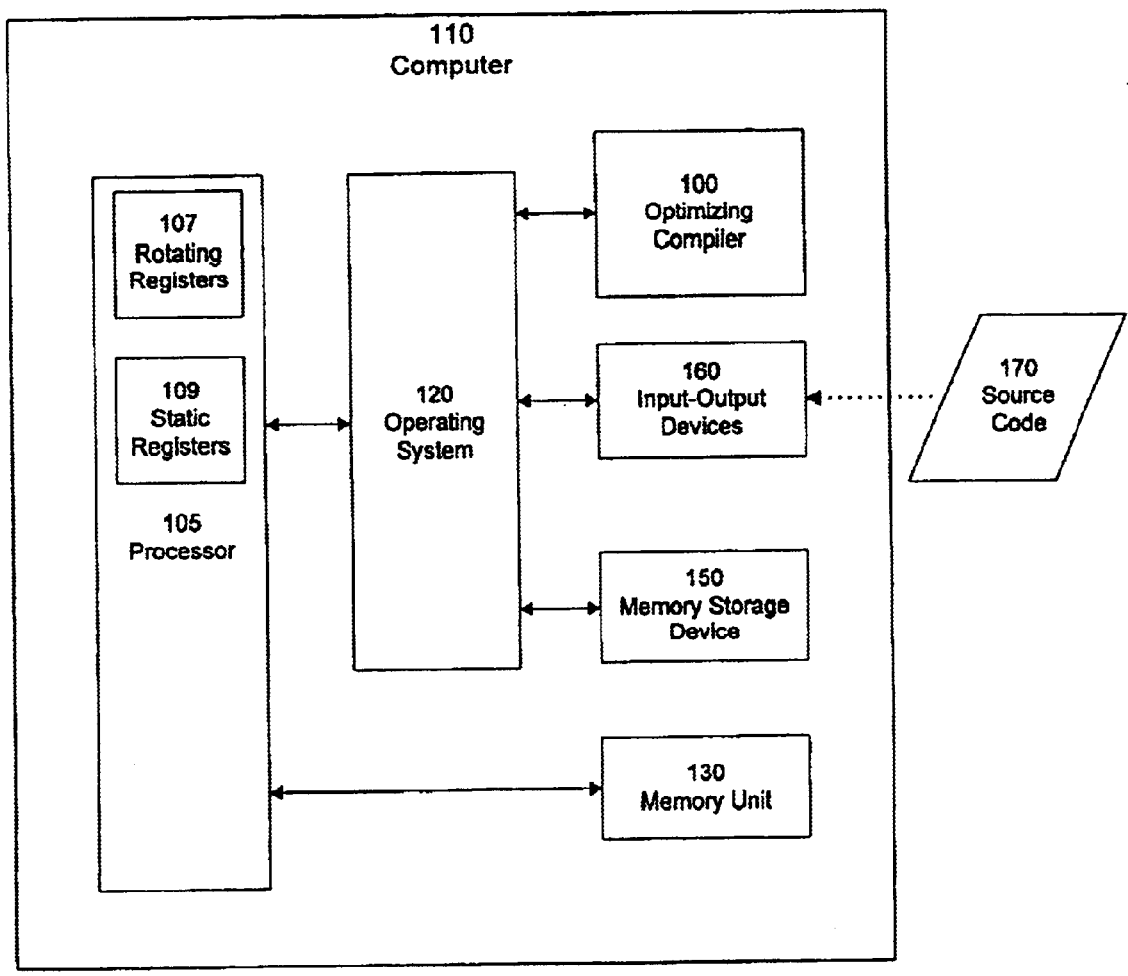
FIG. 1 is a functional block diagram of one embodiment of a computer system on which one embodiment of an optimizing compiler in accordance with the present invention is implemented.

FIG. 1 is a simplified functional block diagram of one exemplary embodiment of a computer system, referred to as computer 110, on which optimizing compiler 100, including scheduler-assigner 420, is implemented. Computer 110 may be a personal computer, network server, workstation, or other computer platform now or later developed. Computer 110 may also be a device specially designed and configured to support and execute the functions of scheduler-assigner 420 as described below. Computer 110 includes known components including processor 105, operating system 120, memory unit 130, memory storage device 150, and input-output devices 160. It will be understood by those skilled in the relevant art that there are many possible configurations of the components of computer 110 and that some components that may typically be included in computer 110 are not shown, such as a video card, data backup unit, and many other devices.

Processor 105 may be any processor now known, or later to be developed, that includes rotating registers 107 (described below) or similar devices or techniques. Processor 105 also typically includes static registers 109 (also described below). An example of a processor with rotating registers is the Cydra 5 processor made by Cydrome. It will be understood that, in alternative embodiments, either or both of rotating registers 107 and static registers 109 may be included in computer 110 but may not be included in processor 105. For example, they may be connected to processor 105. Also, processor 105 may be a variation of any of a variety of commercially available processors that do not currently have rotating registers but that, in the future, may be adapted for use with rotating registers or similar devices or techniques. Some of numerous examples of commercially available processors that currently do not have rotating registers, but could be modified in the future to include them or similar devices or techniques, are the PA-RISC processor made by Hewlett-Packard Company, the SPARC® processor made by Sun Microsystems, the 68000 series microprocessor made by Motorola, or the Alpha processor made by Digital Equipment Corporation.

Processor 105 executes operating system 120 that may be, for example, one of the DOS, Windows 3.1, Windows for Work Groups, Windows 95, Windows 98, or Windows NT operating systems from the Microsoft Corporation, the System 7 or System 8 operating system from Apple Computer, the Solaris operating system from Sun Microsystems, a Unix®-type operating system available from many vendors such as Sun Microsystems, Inc., Hewlett-Packard, or AT&T, the freeware version of Unix® known as Linux, the NetWare operating system available from Novell, Inc., or some combination thereof, or another or a future operating system.

Memory unit 130 may be any of a variety of known memory storage devices or future memory devices, including, for example, any commonly available random access memory (RAM), magnetic medium such as a resident hard disk, or other memory storage device. For example, memory unit 130 may include dynamic random access memory (DRAM) chips. Memory unit 130 may also include a cache memory made up, for example, of static random access memory (SRAM) chips. In some embodiments, all or portions of main memory, for example the cache memory, may be located on the same chip as processor 105.

Memory storage device 150 may be any of a variety of known or future devices, including a compact disk drive, a tape drive, a removable hard disk drive, or a diskette drive. These types of memory storage device 150 typically read from, and/or write to, a program storage device (not shown) such as, respectively, a compact disk, magnetic tape, removable hard disk, or floppy diskette. Any such program storage device may be a computer program product. As will be appreciated by those skilled in the relevant art, these program storage devices typically include a computer usable storage medium having stored therein a computer software program and/or data.

Computer software programs, also called computer control logic, typically are stored in main memory 130 and/or the program storage device used in conjunction with memory storage device 150. These computer software programs, when executed by processor 105, enable computer 110 to perform the functions of the present invention as described herein. Accordingly, such computer software programs may be referred to as controllers of computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. These devices include, for example a keyboard, mouse, touch-screen display, touch pad, microphone with a voice recognition device, network card, or modem. Output devices of input-output devices 160 could include any of a variety of known devices for presenting information to a user, whether a human or a machine, whether local or remote. These devices include, for example, a video monitor, printer, audio speaker with a voice synthesis device, network card, or modem. Input-output devices 160 could also include any of a variety of known removable storage devices, including a CD-ROM drive, a tape drive, a removable hard disk drive, or a diskette drive.

Scheduler-assigner 420 could be implemented in the "C" or "C++" programming languages, although it will be understood by those skilled in the relevant art that many other programming languages could be used. Also, as noted, scheduler-assigner 420 may be implemented in any combination of software, hardware, or firmware. If implemented in software, scheduler-assigner 420 may be loaded into memory storage device 150 through one of input-output devices 160. Scheduler-assigner 420 may also reside in a read-only memory or similar device of memory storage device 150, those devices not requiring that scheduler-assigner 420 first be loaded through input-output devices 160. It will be understood by those skilled in the relevant art that scheduler-assigner 420, optimizing compiler 100, or portions of either or both, may typically be loaded by processor 105 in a known manner into memory unit 130 as advantageous for execution.

Source code 170 may be written in any of a variety of known, or to-be-developed, computer languages such as Fortran, C, C++, and so on. Source code 170 may typically be loaded through an input device of input-output devices 160, such as a diskette drive, and a copy of it (referred to herein as an "image") placed by processor 105 into memory storage device 150 or memory unit 130.

OPTIMIZING COMPILER 100

Optimizing compiler 100 optimizes the execution of source code 170 by a variety of known methods, and also by assigning rotating registers 107 and static registers 109 to modulo scheduled code in static single assignment (SSA) form in accordance with the operations of scheduler-assigner 420. The meanings of the terms "rotating registers," "static registers," "modulo scheduled code," and "SSA form" are now described in relation to the operations of optimizing compiler 100.

As noted, modulo scheduling is one of a class of algorithms for achieving software pipelining, a purpose of which is to improve instruction level parallelism in loops. Software pipelining is analogous to hardware pipelining, which is a known technique for achieving the same purpose by issuing operations to various functional units (hardware units, such as a multiplier, adder, and so on) in parallel. Thus, modulo scheduling is analogous to hardware pipelining of functional units. In particular, both techniques typically enable execution of the instructions of an iteration of a loop before execution of the instructions of a previous iteration has been completed. As also noted, the loop iterations are split into stages in modulo scheduling. These stages are analogous to the stages of a hardware execution pipeline. Moreover, modulo scheduling enables the optimizing compiler to identify and exploit instruction level parallelism across loop iterations (hereafter referred to as "overlapping" of iterations). That is, two or more instructions from different iterations of a loop may be scheduled in parallel.

However, achieving the overlapping of iterations typically requires unrolling of the loop and software renaming of the registers. (The term "unrolling" refers to the practice of specifying the instructions of sequential iterations of a loop.) In a certain type of CPU, however, a kind of register exists that avoids the need to unroll loops and allows software to use renamed registers. These registers are referred to herein as "rotating registers," and the renaming of registers is referred to as "register rotation." A register that is not configured for register rotation is referred to herein as a "static register." The architecture and use of rotating registers are described with respect to the Cydra 5 processor in Rau, et al., supra.

In brief, register rotation is accomplished by changing the effective addresses of rotating registers. For example, it is illustratively assumed that processor 105 has three rotating registers 107, referred to as r1, r2, and r3. During a first iteration, the values contained in these registers are assumed to be 12, 24, and 36, respectively. During a second iteration, the effective addresses of these registers are changed so that the value that is stored in r1 during the first iteration is processed by addressing r2 during the second iteration. Similarly, the value stored in r2 during the first iteration is found in r3 during the second iteration, and the value stored in r3 during the first iteration is found in r1 during the second iteration. Thus, in the second iteration, the values that may be processed with respect to registers r1, r2, and r3 are 36, 12, and 24, respectively. The term "rotating register" will be understood to also include any static register or other register now or later developed that, optionally together with appropriate hardware, firmware, software, other technique, or a combination thereof, duplicates or simulates the function of register rotation.

SSA form is one type of internal data flow representation that commonly is used by compilers to facilitate optimization operations. Other types of internal data flow representation include dynamic single assignment (DSA) form, and "def-use" (definition-use) chains. The terms "data form," or "form," are sometimes hereafter used to refer to these known, or future, techniques for representing data flow and/or control flow information, and thus should be interpreted broadly. Conventionally, SSA form is used to generate more efficient code by enabling optimizing compilers to perform more optimal transformations such as, for example, more efficient instruction scheduling. SSA form is described in greater detail below with respect to the operations of control and data flow information generator 310.

The reason that SSA form (or other data flow representations) enables efficient code generation is that information about data flow reduces the need to make conservative assumptions about dependencies among instructions. An instruction is "dependent" on another if it must be executed after the other is executed. For example, data flow information may reveal that the execution of a particular instruction ("instruction A") does not depend on the execution of another instruction ("instruction B"), even though instruction A follows instruction B in a particular representation of the source code. That is, a calculation or other operation undertaken as a result of the execution of instruction B does not influence the execution of instruction A. Thus, instructions A and B may be scheduled in the same VLIW, or otherwise scheduled, without regard to the execution relation between them. Without this data flow information, it generally would not be possible to pack the two instructions in the same VLIW, for example, without risking an error. Data flow information, such as expressed in SSA form, thus generally enables more efficient scheduling of instructions, including more efficient scheduling by use of software-pipelining algorithms such as modulo scheduling.

Typically, commercial optimizing compilers perform the tasks of modulo scheduling and register allocation separately. In these conventional compilers, modulo scheduling (or another instruction scheduling technique) may conveniently be performed using data flow information provided in SSA form (or using other expressions of data flow information) for the reason of efficient scheduling just described. Conventionally, however, registers are not allocated or assigned to live ranges expressed in SSA form. Rather, the SSA form is discarded and then registers are allocated and assigned to live ranges expressed in non-SSA form. The reason, as is known by those skilled in the art, is that the allocation and assignment of registers in SSA form has conventionally required significant expenditures of execution time and computer resources (e.g., memory capacity). These expenditures generally are not compatible with the underlying objectives of an optimizing compiler to reduce execution time and conserve computer resources.

A number of advantages over conventional techniques are realized due to the capability of the present invention to allocate and assign registers to representations of software-pipelined instructions that have data flow information, such as modulo scheduled instructions in SSA form. First, this capability enables a better balance to be achieved between software-pipelined instruction scheduling on the one hand, and register allocation and assignment on the other. That is, constraints on software-pipelined instruction scheduling are minimized even while efficient register allocation and assignment are accomplished. As noted, reducing the constraints on scheduling allows more efficient packing and thus faster execution, and efficient use of registers minimizes the need for costly register spilling.

A second advantage is that better integration is achieved between software-pipelining for instructions in loops and scheduling of instructions outside of loops. In particular, because instruction scheduling may be implemented both on loop instructions (using, e.g., modulo scheduling) and non-loop instructions (using list scheduling) having the same data flow information (e.g., representations of instructions in SSA form), there is no need to transfer between different representations for scheduling loops and portions of procedures outside of loops. Transferring between data flow representations can be expensive in terms of time and memory usage, and may even cause loss of accuracy. Thus, more efficient global scheduling (i.e., scheduling across the procedure, including loops and non-loops) generally is accomplished in accordance with the invention as compared to known techniques in which software pipelining within loops is done separately from list scheduling outside of loops.

Third, the amount of information that must be processed in order to allocate and assign registers globally is reduced because rotating registers have already been allocated during the process of software pipelining the loops (e.g., during modulo scheduling). Without this prior allocation of rotating registers in loops, the global scheduler would have to maintain and process information in a known manner for all loops in the procedure while generating a global schedule for the procedure as a whole.

In addition, some embodiments advantageously employ SSA form because it is more efficient than other known techniques for representing control and data flow, such as dynamic single assignment (DSA) form. In particular, as is known to those skilled in the relevant art, SSA form employs a simpler algorithm than is used in implementing DSA form, thus consuming less memory and requiring less time to compile instructions.

Figure 2:
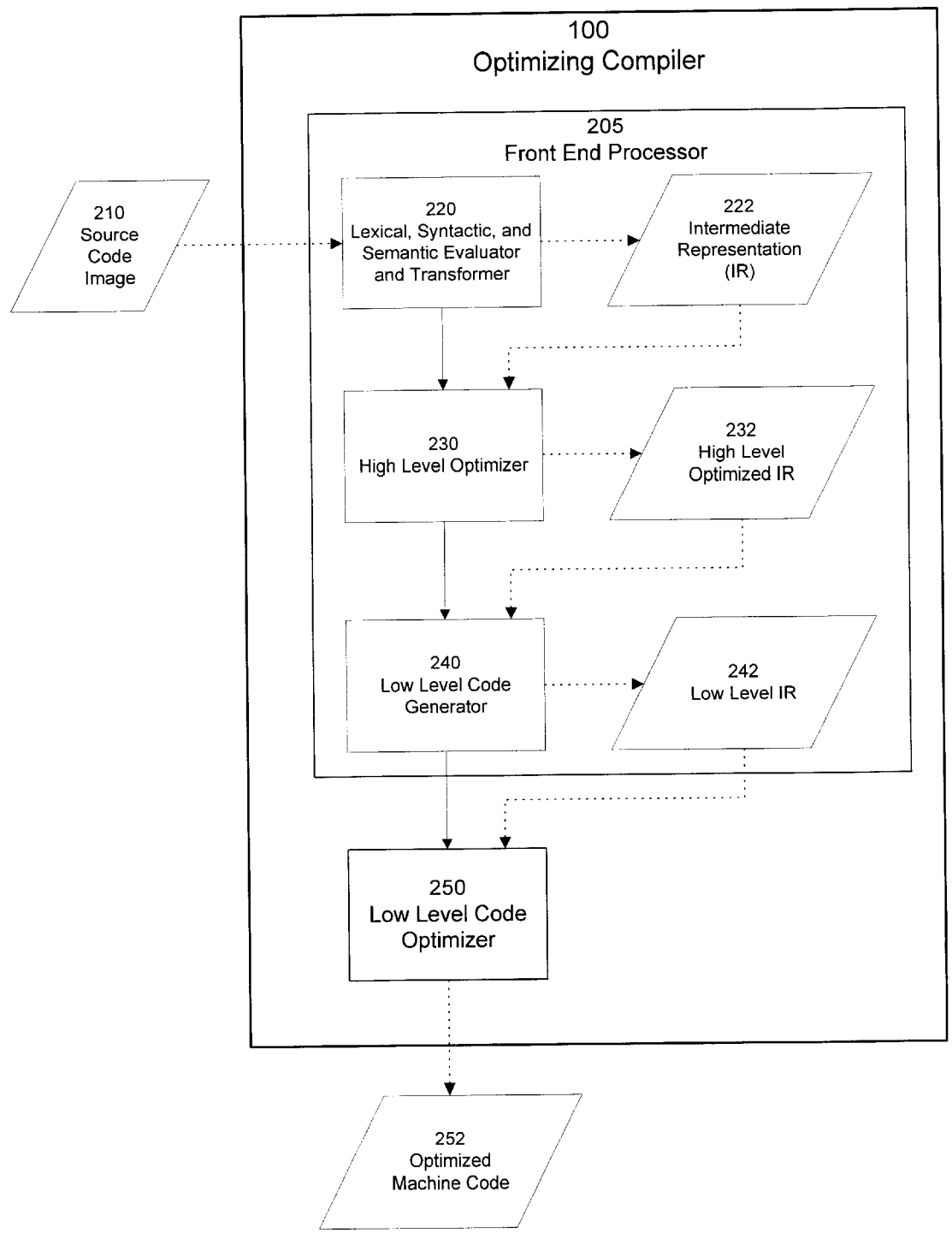
FIG. 2 is a functional block diagram of the optimizing compiler of FIG. 1.

FIG. 2 is a functional block diagram of optimizing compiler 100 including front end processor 205 and low level code optimizer 250. Front end processor 205 applies known, high-level, typically machine-independent, optimizing transformations to an image of source code 170. This image is represented in FIG. 2 by source code image 210. The result is a low level intermediate representation ("IR") of the source code, represented in FIG. 2 by low level IR 242. An intermediate representation is a representation of source code image 210 that facilitates one or more operations of optimizing compiler 100. (For a detailed description of intermediate representations and their uses, see S. Muchnick, supra, at pp. 67–103.) Low level code optimizer 250 applies low level, typically machine-dependent, optimizing transformations to low level IR 242 to produce machine code that may be directly executed by processor 105. This machine code is represented in FIG. 2 by optimized machine code 252. These two principal components of optimizing compiler 100, i.e., front end processor 205 and low level code optimizer 250, are now described in greater detail.

FRONT END PROCESSOR 205

Front end processor 205 implements known high-level processing and optimization techniques to optimize source code image 210 and to provide the high-level optimized code in an intermediate representation suitable for low level optimization. Front end processor 205 includes lexical, syntactic, and semantic evaluator and transformer 220. Transformer 220 performs various known operations on source code image 210 to produce IR 222. As is well known to those skilled in the art, these operations typically include lexical analysis of source code image 210 to produce tokens for parsing and further analysis; translation based on the attributes of the programming language in which source code image 210 is written; semantic evaluation; and other operations. Further description of these operations is provided in Aho, et al., supra, at pp. 25–277.

Front end processor 205 also includes high level optimizer 230. High level optimizer 230 applies to IR 222 known high level optimization techniques such as subprogram inlining, instruction and data cache usage optimizations, and advanced loops optimizations. See, generally, S. Muchnick, supra. The resulting optimized code is represented in FIG. 2 by high level optimized IR 232.

Also included in front end processor 205 is low level code generator 240. In accordance with any of a variety of known techniques, generator 240 produces a machine-dependent representation of high level optimized IR 232. This machine-dependent representation is represented by low level IR 242, which is described in greater detail below in relation to the illustrative example of FIG. 7B.

LOW LEVEL CODE OPTIMIZER 250

Figure 3:
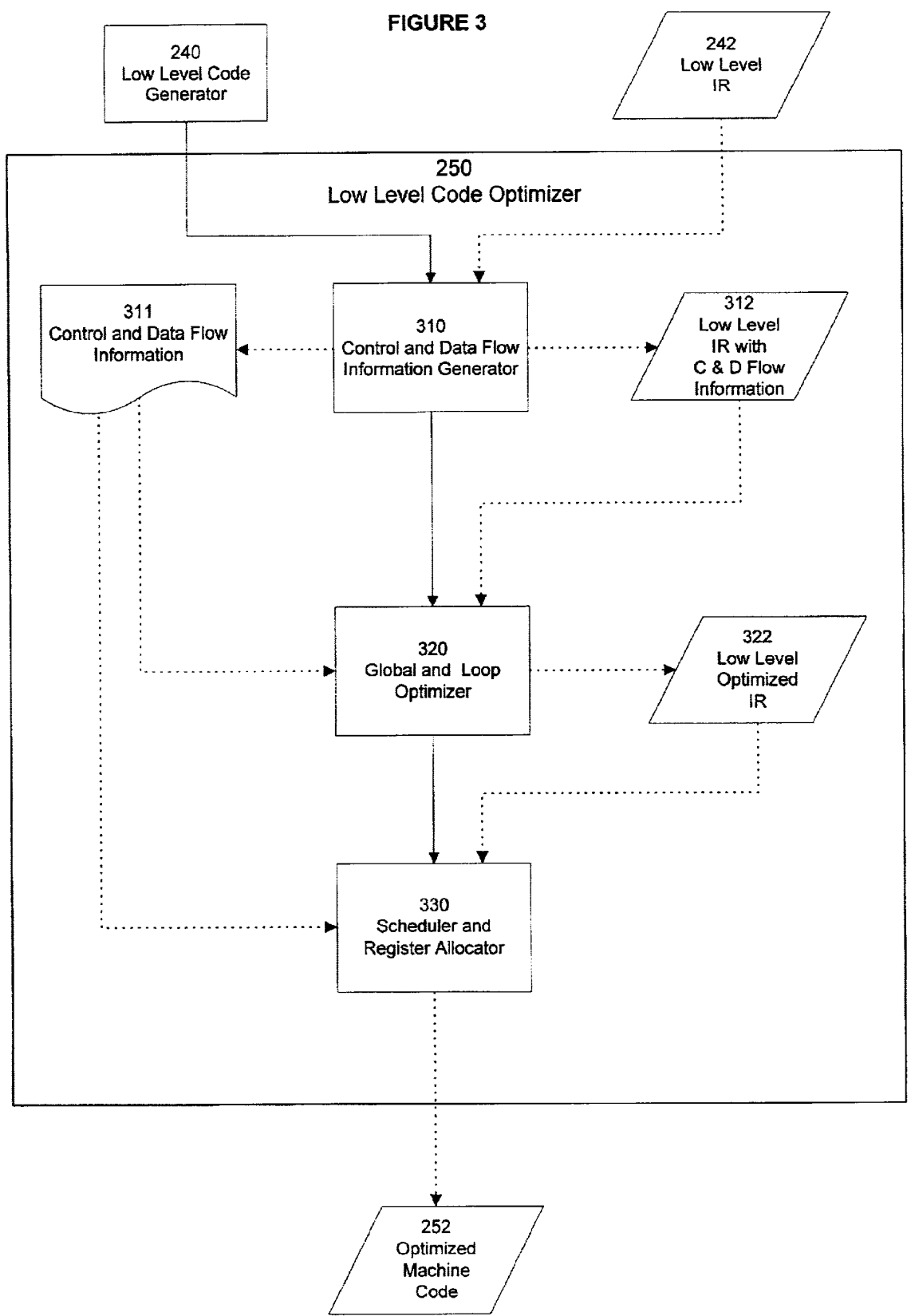
FIG. 3 is a functional block diagram of one embodiment of a low level code optimizer of the optimizing compiler of FIG. 2.

Low level code optimizer 250 assumes control from low level code generator 240 and operates on low level IR 242. As noted, low level code optimizer 250 applies low level, typically machine-dependent, optimizing transformations to low level IR 242. In particular, low level code optimizer 250 implements known types of instruction scheduling, such as region scheduling and modulo scheduling, and applies related known optimization techniques, such as if-conversion and tree height reduction. (A "region" is a portion of a program defined by control-flow analysis. See Muchnick, supra, at pp. 172–175 for details.) Low level code optimizer 250 also performs register allocation and assignment, including allocation and assignment of rotating registers 107 and static registers 109. The operations of low level code optimizer 250 are now described in greater detail with respect to FIG. 3, which is a functional block diagram of optimizer 250. As shown in FIG. 3, optimizer 250 includes control and data flow information generator 310, global and loop optimizer 320, and scheduler and register allocator 330.

Control and Data Flow Information Generator 310

Control and data flow information generator 310 employs any of a variety of known techniques in order to generate control and/or data flow information that is applied to the intermediate representation of IR 242. In particular, with respect to the illustrated embodiment, generator 310 generates data-flow information that is subsequently used by global scheduler 410, described below, and is represented in SSA form. More generally, the data flow information is used to ensure the correct identification of live ranges that are subjected to various optimizations. The control flow information generated by generator 310 is used in accordance with known techniques to identify code structures, such as loops, that may be amenable to optimization. The intermediate representation resulting from the operations of generator 310 is shown in FIG. 3 as "low level IR with control and data (C&D) information 312."

The operations of control and data flow information generator 310 are now described in greater detail in relation to FIGS. 7A–7C. FIG. 7A is a representation of an illustrative fragment of source code image 210 suitable for processing by optimizing compiler 100. The left column of FIG. 7A indicates instruction numbers (i.e., instructions 7A-1 through 7A-10) that are provided for convenience of reference only and do not appear in source code image 210. (The left columns of FIGS. 7B–7D similarly indicate instruction numbers of their respective intermediate representations, and are provided for convenience of reference only.) It will be understood that the illustrated fragment of source code image 210 is merely representative of a high level programming language, such as C, and may be expressed in numerous forms. As will be evident to those skilled in the relevant art, instruction 7A-1 defines a loop-counting integer used in the loop from instructions 7A-5 to 7A-9. Instructions 7A-2 and 7A-3 define integer arrays with 1000 elements each. Instruction 7A-4 initializes the variables c and x to 0. Instruction 7A-5 defines the loop parameters; i.e., the loop is processed for i equal 0 to 999 where i is incremented by 1 for each loop iteration.

FIG. 7B is a representation of low level IR 242 that is generated by front end processor 205 as a result of its operations on the fragment of source code image 210 shown in FIG. 7A. As noted, low level IR 242 is generated by front end processor 105 in accordance with known techniques. It will be understood that low level IR 242 is representative of many variations of a low level IR that may be so created, and that it is not material to the invention which particular form of low level IR 242 is used. Similarly, all other intermediate representations described herein are illustrative only, and it will be understood that many other forms of these representations generally may be operated upon by optimizing compiler 100 or by other embodiments of the present invention.

Instruction 7B-1 includes the address label L1 that identifies the address of the basic block of code executed immediately before the portion of low level IR 242 representing the source code fragment of source code image 210 shown as instructions 7A-5 to 7A-9 of FIG. 7A. The term "basic block" is used herein to refer to a sequence of instructions such that the only way that control may enter the basic block is through the first instruction in the sequence, and the only way that control may exit the basic block is through the last instruction in the sequence. It will be understood that a basic block may be otherwise defined, and that this definition is not material to the present invention. Instruction 7B-2 includes the address label L0 that identifies the address of the beginning of the low level intermediate representation of this source code fragment.

Instruction 7B-2, and most subsequent instructions to be described below, involve the use of registers of various types. Registers typically are classified according to one or more of the following schemes. As already noted, a register may be rotating or static. A register may also be either virtual or real. A virtual register is one that is imagined to exist, usually for purposes of determining a scheme for register usage. Typically, after the usage of an imaginary set of virtual registers has been determined, this usage is mapped to a corresponding set of real registers. A real register is a physical register; i.e., one that actually exists in the hardware of the CPU for which the register usage is being determined. In addition, any combination of the preceding types of registers may further be categorized in accordance with whether they constitute a predicate register or a general purpose register. Also registers may be categorized by other types, such as a floating point register, that are not material to the present invention. A predicate register is one that enables or disables the execution of an associated instruction. For example, if an instruction has a predicate register holding a value of 0, the instruction is not executed. If this predicate register holds a value of 1, the instruction is executed. A general purpose register typically is used to hold the value of a variable, an address, the address of an address (an indirect address), or other value. The following acronyms, listed in Table 1, are used hereafter to represent these registers.

TABLE 1

Register Acronyms

| | |
|---|---|
| SVGR | static, virtual, general-purpose, register |
| SVPR | static, virtual, predicate, register |
| SRGR | static, real, general-purpose, register |
| RVPR | rotating, virtual, predicate, register |
| RRPR | rotating, real, predicate, register |
| RRGR | rotating, real, general-purpose, register |

Thus, SVGR1, for example, refers to static, virtual, general-purpose, register number one, or the value stored therein, as the context requires. Brackets are used herein to indicate an indirect address for a value. That is, for example, [SVGR0] represents the value stored in a memory location, the address of which is stored in SVGR0.

With respect to all instructions in FIGS. 7B–9C, the convention arbitrarily is used that the target of the operation carried out by the instruction is shown on the left side of an equal sign. The operation, such as multiply (mul), add, compare (comp), and so on, precedes the target on the left. The operands are shown on the right side of the equal sign. As will be evident to those skilled in the relevant art, the instructions shown in FIGS. 7B–9C are symbolic only; that is, they are provided in a form that is convenient for human interpretation. It will be understood that the actual instructions typically are in formats that are more convenient for machine interpretation. Instruction 7B-2 thus symbolically represents the operation of loading into SVGR1 the value contained in a memory location, the address of which is stored in SVGR0. It is assumed for illustrative purposes that a portion of low level IR 242, preceding that portion shown in FIG. 7B and not shown, caused the loop-counter variable "i" to be associated with this memory location. Instruction 7B-2 thus causes the current value of the variable "i" to be loaded into SVGR1. As will be evident to those skilled in the relevant art, instruction 7B-2 and the remaining instructions of FIG. 7B implement the loop portion of the source code fragment of FIG. 7A. The purposes and effects of these remaining instructions will also be evident to those skilled in the relevant art, and are summarized in Table 2, below, to facilitate further description of register allocation by optimizing compiler 100.

TABLE 2

Summary of Purposes and Effects of Instructions of FIG. 7B

| Inst.# | Instruction from Low Level IR 242 | Summary of Purpose and Effect |
|---|---|---|
| 7B-1 | L1: [basic block 1 code] | Label L1 identifies the start of the basic block (not shown) immediately preceding the loop instructions. |
| 7B-2 | L0: load SVGR1 = [SVGR0] | Load the current value of the loop-counter variable, "i," into SVGR1. |
| 7B-3 | mul SVGR3 = SVGR1 * SVGR2 | It is assumed that a previous instruction, not shown placed in SVGR2 the size of the elements in array b; for example 4 bytes, which is a typical size of an instruction word in a 32-bit architecture. The product of SVGR1 * SVGR2, loaded into SVGR3, therefore is the offset from the base address of array b to the element b(i). |
| 7B-4 | add SVGR5 = SVGR4 + SVGR3 | It is assumed that a previous instruction, not shown, placed in SVGR4 the base address of array b. Therefore, the add operation stores in SVGR5 the address of the element b(i). |
| 7B-5 | load SVGR6 = [SVGR5] | The value at the address contained in SVGR5, i.e., the value of b(i), is loaded into SVGR6. |
| 7B-6 | load SVGR8 = [SVGR7] | It is assumed that a previous instruction, not shown, placed in SVGR7 the address of a memory location containing the current value of the constant c. The value of c is loaded into SVGR8. |
| 7B-7 | add SVGR9 = SVGR6 + SVGR8 | The current value of b(i) + c is stored in SVGR9. |
| 7B-8 | mul SVGR11 = SVGR1 * SVGR10 | It is assumed that a previous instruction, not shown, placed in SVGR10 the size of the elements in array a. The product of SVGR1 * SVGR10, loaded into SVGR11, therefore is the offset from the base address of array a to the element a(i). |
| 7B-9 | add SVGR13 = SVGR11 + SVGR12 | It is assumed that a previous instruction, not shown, placed in SVGR12 the base address of array a. Therefore, the add operation stores in SVGR13 the address of the element a(i). |
| 217B -10 | store [SVGR13] = SVGR9 | Store the current value of b(i) + c into the address contained in SVGR13, i.e., the address of the element a(i). This instruction therefore completes the functions represented by source code instruction 110-7 for the current iteration of the loop. |

TABLE 2-continued

Summary of Purposes and Effects of Instructions of FIG. 7B

| Inst.# | Instruction from Low Level IR 242 | Summary of Purpose and Effect |
|---|---|---|
| 7B-11 | load [SVGR14] into SVGR15 | It is assumed that a previous instruction, not shown, placed in SVGR14 the address of a memory location containing the current value of the variable x. The current value of x is loaded into SVGR15. |
| 7B-12 | add SVGR16 = SVGR15 + SVGR9 | The current value of x is added to the current value of the element a(i), and the result is stored in SVGR16. |
| 7B-13 | store [SVGR14] = SVGR16 | Store the result of x + a(i) into the memory location for the variable x. Thus, the variable x is given a new current value, and the functions represented by instruction 110-8 are implemented. |
| 7B-14 | comp SVPR0 = SVGR1, 1000 | Compare the current value of the loop-count variable, "i," with the integer 1000. If the two values are not equal, put a "false" value (for example, 0) in the predicate register SVPR0. If they are equal, put a "true" value (for example, 1) in SVPR0 |
| 7B-15 | <SVPR0> jump to L0 | If SVPR0 has a true value, jump to the instruction at the label L0. This instruction completes the loop. |

As noted, the instructions represented by low level IR 242 are operated upon by control and data flow information generator 310. In accordance with any of a variety of known techniques, such as the generation of a control flow graph, generator 310 generates control and data flow information 311. Information 311 in a known manner facilitates the identification of live ranges of variables to ensure that transformations among various forms of intermediate representations do not cause register interferences that might alter the meaning of the code. For example, a variable may be identified as being live coming into a loop and leaving it. Therefore, if the value of this variable is stored in a register coming into the loop, this register must not be used to store another value in the loop unless the first value is first preserved by moving it to another location (i.e., the register is spilled). Failure to identify and resolve these register interferences, also referred to herein as "interfering live ranges," may cause an unintended result when the compiled code is executed. As noted, control and data flow information 311 also facilitates the identification of structures, such as loops, upon which known optimization techniques typically are applied.

As also noted, optimizing compilers commonly employ a known internal data flow representation known as SSA form to facilitate low level optimization operations such as code motion, elimination of partial redundancies, and constant propagation. The purposes and effects of using SSA form, and some methods for creating SSA form, are described in R. Cytron, et al., "Efficiently Computing Static Single Assignment Form and the Control Dependence Graph," in *ACM Transactions on Programming Languages and Systems*, Vol. 13, No. 4 (October 1991) at pp. 451–490. In brief, to transform instructions into SSA form, an optimizing compiler typically assigns a unique name to each assignment of a variable. Each use of the variable is also renamed so that it matches the assignment names that could reach that use. Table 3 provides a simple illustrative example of this renaming as applied to a fragment of straight-line source code.

TABLE 3

Straight-Line Code and SSA form

| Original Code | SSA form |
|---|---|
| x = c | x1 = c |
| z = x + b | z = x1 + b |
| x = d | x2 = d |

The same principles for constructing SSA form apply to more complicated structures, such as loops and branches, as represented by the illustrative example of Table 4. As noted above, these structures may conveniently be described by a control flow graph. In accordance with one of a variety of known techniques, the instructions to be represented by this graph are divided into basic blocks. Each basic block constitutes a node of the graph. Typically, arrows, referred to as edges, connect each node to one or more other nodes so as to represent all of the ways by which control could pass among nodes. A node into which two or more arrows point, i.e., into which control may pass through two or more edges from two or more predecessor nodes, is typically referred to as a join node. A node from which two or more arrows point, i.e., from which control may pass through two or more edges into two or more successor nodes, is typically referred to as a branch node.

TABLE 4

If-Then Code and SSA form

| Inst # | Node # | Original Code | SSA form |
|---|---|---|---|
| 1 | 1 | if T | if T |
| 2 | 2 | then x = a | then x1 = a |
| 3 | 3 | else x = b | else x2 = b |
| 4 | 4 | y = x + c | x3 = phi (x1, x2) |
| 5 | | | y = x3 + c |

The fourth instruction in the SSA form of the illustrative example of Table 5 employs what is commonly referred to as a "phi function" to ensure that each variable is the target of one, and only one, definition or assignment statement.

That is, the definition of the variable x3 as being equal to the phi function of the operands x1 and x2 means that the value of x3 depends on whether control has passed through the x1 variable or the x2 variable. In particular, the value of x3 at a particular point in execution at which control has passed to the fourth instruction is equal to the value of either x1 or x2, depending on which of the two was most recently defined prior to control passing to this fourth instruction. Generally, a phi function for a variable V is inserted at each join node having predecessor nodes containing a definition of V or a phi function for V. Because node 4 is a join node having predecessor nodes 2 and 3 in which the variable x (renamed x1 and x2) is defined, a phi function for the variable x, renamed x3, is inserted at node 4, as shown in Table 4.

In the illustrative example of the fragment of low level IR 242 represented by FIG. 7B, there is only one definition for each variable. Therefore, in accordance with the rules for creating an SSA form, generator 310 does not operate upon these illustrative instructions to rename variables having multiple definitions. Thus, the instructions of low level IR with control and data flow information 312, as represented in FIG. 7C, are the same as the instructions of low level IR 242, as represented in FIG. 7B. It will be understood that, in other illustrative examples, the instructions of FIG. 7C may differ from those of FIG. 7B due to the renaming of variables in accordance with the rules for creating SSA form, or the introduction of other forms of control and data flow information.

Global and Loop Optimizer 320

Low level code optimizer 250 also includes global and loop optimizer 320. The term "global" refers in this context to operations that are applied to a procedure as a whole, as contrasted, for example, with operations that generally are limited to a particular region of a procedure, such as a loop. Optimizer 320 assumes control from control and data flow information generator 310 and operates upon IR 312. In particular, optimizer 320 applies to IR 312 any of a variety of known global, low level optimization techniques. Examples of these techniques include constant propagation, global code motion, copy propagation and elimination, register promotion, strength reduction on loops, and loop unrolling. These techniques may have also been employed by high level optimizer 230. However, as will be evident to those skilled in the relevant art, IR 312 provides information to optimizer 320 that generally enables it to achieve optimizations not achievable by optimizer 230, such as code motion of instructions rather than operational code. One such optimization that may thus be applied by optimizer 320, and that generally may not be applied by optimizer 230 because of lack of information regarding register usage, is register promotion. Register promotion is the action of loading values from a memory location into a register, thus avoiding subsequent time-consuming loads and stores from memory.

The intermediate representation resulting from the operations of optimizer 320 is shown in FIG. 3 as "low level optimized IR with control and data flow information 322." FIG. 7D is a representation of an illustrative example of a fragment of low level optimized IR 322 resulting from illustrative operations of global and loop optimizer 320 on the fragment of IR 312 represented in FIG. 7C. The purposes and effects of the instructions of FIG. 7D will be evident to those skilled in the art, but are summarized in Table 5, below, to clarify register usage in accordance with the present invention.

TABLE 5

Summary of Purposes and Effects of Instructions of FIG. 7D

| Inst.# | Instruction from Low Level Optimized 1R 322 | Summary of Purpose and Effect |
|---|---|---|
| 7D-1 | L0: phi SVGR17 = SVGR18, L1, SVGR19, L0 | Phi function in accordance with SSA form for the address of array element b(i), described in greater detail below. |
| 7D-2 | add SVGR19 = SVGR17 + SVGR20 | SVGR17 is allocated to hold the address at which the value of the "i" th element of array b, b(i), is stored for the value of "i" prior to the present iteration of the loop. SVGR20 is allocated to hold the size of the elements in array b. This constant is placed in SVGR20 by optimizer 320 to implement a loop-invariant code motion optimization; i.e., to avoid reloading this constant for each iteration of the loop. SVGR19 thus holds the address of the current value of b(i) for the current value of the loop-counter variable, "i," since successive elements of the array are displaced from each other by a distance equal to the element size. |
| 7D-3 | load SVGR6 = [SVGR19] | Load the value of b(i) into SVGR6. This is an example of optimization by register promotion. |
| 7D-4 | add SVGR9 = SVGR6 + SVGR8 | The current value of b(i) + c is stored in SVGR9. The use of SVGR8 to hold the value of c is an example of a loop-invariant code motion optimization. |
| 7D-5 | phi SVGR21 = SVGR22, L1, SVGR23, L0 | Phi function for the address of the array element a(i), described in greater detail below. |
| 7D-6 | add SVGR23 = SVGR21 + SVGR24 | SVGR21 is allocated to hold the address at which the value of the "i" th element of array a, a(i), is stored for the value of "i" prior to the present iteration of the loop. SVGR24 is allocated to hold the size of the elements in array a. SVGR23 thus holds the address of the current value of a(i) for the current value of the loop-counter variable, "i." |

TABLE 5-continued

Summary of Purposes and Effects of Instructions of FIG. 7D

| Inst.# | Instruction from Low Level Optimized 1R 322 | Summary of Purpose and Effect |
|---|---|---|
| 7D-7 | store [SVGR23] = SVGR9 | Store the current value of b(i) + c into the address holding the current value of a(i). |
| 7D-8 | phi SVGR25 = SVGR26, L1, SVGR27, L0 | Phi function for variable x, described in greater detail below. |
| 7D-9 | add SVGR27 = SVGR25 + SVGR9 | The current value of x is added to the current value of a(i), and the result is stored in SVGR27. |
| 7D-10 | conditional jump to L0 | The compare instruction and predicate register have been eliminated because it is assumed that equivalent operations, associated with this conditional jump instruction, are performed in a known manner by a countdown register that automatically decrements for each iteration These operations are not material to the present invention. |

As noted in Table 5, instruction 7D-1 is the phi function for the address of the array element b(i). In accordance with SSA form, the phi function includes operands that represent each of the possible definitions of this address that are capable of reaching the join node at which the phi function is inserted. The phi function is inserted in this example at location L0 because L0 is the beginning of the join node for the top of the illustrative loop. The operands are listed in any arbitrary order that is consistent throughout the SSA form. In the phi function of instruction 7D-1, the first operand is arbitrarily chosen to represent the definition of the address of b(i) if control reaches L0 through the loop header, i.e., instructions 7A-1 through 7A-4 as represented in FIG. 7A. SVGR18 is allocated to hold this definition of the address of b(i).

Control may also pass to L0 through a basic block that is executed immediately before control reaches L0. The starting address of this basic block is assumed to be L1, as represented by instruction 7B-1 as shown in FIG. 7B. The second operand, L1, therefore represents the definition of the address of b(i) as it exists in that basic block. Because this definition involves source code that is not included in the present illustrative example, the operations of the present invention upon the operand L1 will not be considered. The third operand represents the definition of the address of b(i) that exists while control is within the loop, as implemented by instruction 7D-2. SVGR19 is allocated to hold this definition of the address of b(i). Control may also pass to L0 from the bottom of the loop. The fourth operand, L0, represents the definition of the address of b(i) as control enters L0 from the bottom of the loop. The operand SVGR19 is the register into which the address of b(i) is loaded within the loop.

Instruction 7D-5 is the phi function for the address of the array element a(i). The phi function includes operands that represent each of the possible definitions of this address that are capable of reaching the join node at which the phi function is inserted. Thus, following the arbitrary convention regarding ordering of operands as described above, SVGR22 is allocated to hold this definition if control has most recently passed through the loop header. With respect to the second operand, L1 represents the definition if control has most recently passed through the basic block starting at the address L1. With respect to the third operand, SVGR23 is allocated to hold the definition that exists while control is within the loop, as implemented by instruction 7D-6. With respect to the fourth operand, L0 represents the definition of the address of a(i) as control enters L0 from the bottom of the loop. Instruction 7D-8 is the phi function for the variable x. That is, the operands of the phi function each represent a definition of the address at which the current value of the variable x is stored. The registers SVGR26 and SVGR27 are allocated with respect to the first and third operands to hold alternative definitions in accordance with the scheme for ordering or operands described above.

Scheduler and Register Allocator 330

Scheduler and register allocator 330 operates on IR 322 and produces optimized machine code 252, which is the optimized, machine-executable code that is the output of optimizing compiler 100. More specifically, scheduler and register allocator 330 performs instruction-level, machine-dependent scheduling. Typically, this instruction scheduling includes if-conversion, tree-height reduction, region scheduling, and modulo scheduling, if applicable, in accordance with known techniques. Scheduler and register allocator 330 also allocates static registers 109 and rotating registers 107 to instruction-scheduled code. The operations of scheduler and register allocator 330 are now described in detail with respect to FIGS. 4–6, and 8A–9C. As shown in FIG. 4, scheduler and register allocator 330 includes global scheduler 410 and modulo scheduler and register allocator/assigner 420.

Global Scheduler 410

Global scheduler 410 applies any of a variety of known instruction scheduling techniques other than modulo scheduling and register allocation. These other techniques typically include global scheduling, i.e., instruction scheduling across an entire region or groups of regions; if-conversion, i.e., use of predicates to eliminate branches; and height reduction, i.e., use of data flow and data dependency information to reduce critical paths. Global scheduler 410 also inserts NOP's in accordance with known techniques. The abbreviation "NOP" stands for "no operation." That is, although the processor may execute a number of instructions in parallel, the capability to execute one or more of those parallel instructions is not exercised. For example, if a VLIW may contain up to six instructions to be executed in parallel, six "slots" may be designated in each VLIW into which the six instructions may be placed. However, some of those slots may contain NOP's, indicating that no instruction is executed in these slots. The insertion of NOP's facilitates the placement of spill code, if necessary, by modulo scheduler and register allocator/assigner 420, as described below.

Global scheduler 410 assumes control from global and loop optimizer 320 and operates upon IR 322 to produce "list scheduled IR with control and data flow information 412." The term "scheduled" indicates that instruction-level parallel processing is implemented in IR 412. The term "list" indicates that the schedule is not necessarily a packed schedule for loops such as those achieved by software pipelining techniques, e.g. by modulo scheduling.

More generally, it will be understood that the term "list scheduled intermediate representation with control and data flow information" (referred to hereafter for convenience as "list scheduled IR") is used herein to refer to a scheduled intermediate representation that typically, as in the illustrated embodiment, includes: (a) control and data flow information, as generated, for example, by generator 310; and (b) the results of the optimizations and other operations described above with respect to front end processor 205. However, in alternative embodiments, the process of generating a list scheduled IR may exclude any one or more of the optimizations and other operations of front end processor 205. For example, in an alternative embodiment, a list scheduled IR may not include high-level optimizations such as are typically provided by high level optimizer 230.

FIG. 8A is a representation of an illustrative example of a fragment of IR 412 resulting from illustrative operations of global scheduler 410 on the fragment of IR 322 represented in FIG. 7D. Because the instruction scheduling operations of scheduler 410 are machine-dependent, an illustrative machine architecture is assumed. It will be understood that many other architectures are possible, and that the choice of the architecture generally is not material to the present invention. The illustrative machine architecture assumes that processor 105 processes VLIW's having six instructions per VLIW. It is further assumed for illustrative purposes that each VLIW may include up to two memory instructions, i.e., a load or store; up to 4 arithmetic or logical operations; and up to one jump instruction. It is also illustratively assumed that the latency period of a load is two machine cycles, and that the latency period for all other operations is one machine cycle.

The top row of FIG. 8A indicates slot numbers and is provided for convenience of reference only. As noted, it is assumed for illustrative purposes that the architecture of processor 105 supports the execution of up to six instructions (each occupying one slot) in each machine cycle. IR 412 is shown for clarity in FIG. 8A, however, as having only three slots for each machine cycle because the remaining slots in each cycle, in this illustrative example, contain only NOP's. It will be understood that FIG. 8A (as well as FIGS. 8B–9C) could alternatively have been shown with six slots for each cycle.

The designations in the left-most column of FIG. 8A (i.e., 8A-0 through 8A-5 ) indicate machine cycles and are provided for convenience of reference only. Machine cycle 8A-0 of FIG. 8A contains the phi functions for the addresses of the illustrative loop variables b(i), a(i), and x, corresponding to instructions 1, 5, and 8, respectively, of FIG. 7D. As will be evident to those skilled in the relevant art, this 0th cycle is provided for purposes of implementing the SSA form and does not constitute an actual machine cycle. In contrast, cycles 8A-1 through 8A-5 represent actual machine cycles. The numbers in brackets in FIG. 8A correspond to the instruction numbers of FIG. 7D. For example, the designation "[1]" appears at the beginning of the instruction that occupies slot#1 of cycle 8A-0. This designation indicates that this instruction corresponds to instruction one of FIG. 7D (i.e., instruction 7D-1). It will be understood that these bracketed numbers are provided for convenience of reference and comparison only, and are not included in the instructions of IR 412.

In a known manner, cycles 8A-1 through 8A-5 include instructions from IR 322 that are packed in accordance with the machine architecture constraints stated above. Thus, for example, no instructions are executed during machine cycle 8A-3 because the load operation in cycle 8A-2 has a latency period of two cycles. As will be evident to those skilled in the relevant art, the instruction packing also is constrained by information flow. That is, for example, instruction 7D-9 in cycle 8A-5 cannot be executed before instruction 7D-4 in cycle 8A-4 is executed so that the proper value is present in SVGR9.

In accordance with conventional techniques, static registers are used to implement the instructions of IR 412. Moreover, these static registers are virtual, as compared with real, registers. Virtual registers typically are specified for the allocations of IR 412, and of the preceding IR's (IR 242, IR 312, and IR 322), because the process of allocating registers has not been completed. Typically, assignment to real registers occurs once allocation is completed. Thus, as may be noted from FIG. 8A, static, virtual, general-purpose registers (SVGR) are used to implement the instructions of IR 412 (and of the preceding IR's).

Modulo Scheduler and Register Allocator/Assigner 420

In the illustrated embodiment, modulo scheduler and register allocator/assigner ("scheduler-assigner") 420 assumes control from global scheduler 410 and operates upon list-scheduled IR 412. It will be understood, however, that, in other embodiments, scheduler-assigner 420 may operate before, or without, global scheduler 410. That is, for example, scheduler-assigner 420 may operate on an intermediate representation that has not been list scheduled.

Scheduler-assigner 420 performs modulo scheduling and rotating register allocation and assignment in SSA form. Scheduler-assigner 420 also assigns static registers, and inserts spill code if necessary, to code that advantageously is in non-SSA form. The task of modulo scheduling is integrated with the tasks of rotating register allocation and assignment. Moreover, these tasks typically are integrated with the task of static register assignment and insertion of spill code, if necessary. More specifically, and as described in greater detail below, a modulo schedule is generated and rotating registers are allocated to the schedule. If there are not enough rotating registers available for allocation, the modulo schedule is revised to reduce the number of rotating registers that must be allocated, if possible. This iterative procedure thus balances the goal of achieving instruction level parallelism with the benefits of using rotating registers, and does so by operating on intermediate representations in the same data-flow form. The use of the same data-flow form (i.e., SSA form in the illustrated embodiment) avoids the costs of switching forms while retaining the ability to accurately represent data dependencies so that conservative assumptions need not be applied to instruction scheduling. Data-flow information may then be discarded, static registers may be assigned, and spill code may be inserted if necessary. In many cases, it is possible to insert spill code without disturbing the modulo schedule. In other cases, the spill code may be inserted and then the attempt to modulo schedule may be repeated. The operations of scheduler-assigner 420 are now described in greater detail with respect to FIG. 5, which is a functional block diagram of scheduler-assigner 420.

Figure 5:
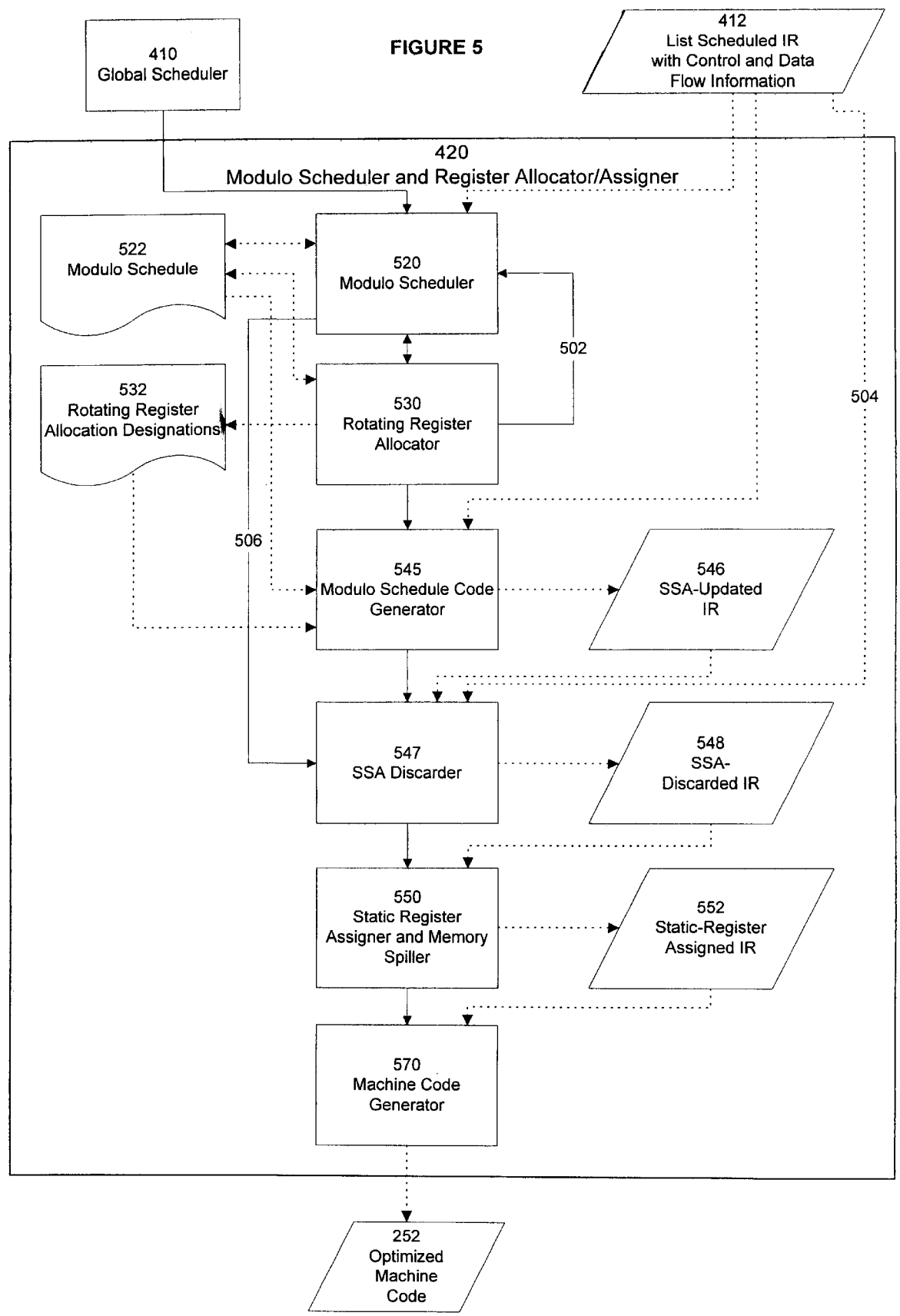
FIG. 5 is a functional block diagram of one embodiment of a modulo scheduler and register allocator/assigner of the scheduler and register allocator of FIG. 4.

Modulo Scheduler 520: As shown in FIG. 5, modulo scheduler and register assigner 420 includes modulo scheduler 520. Modulo scheduler 520 assumes control from global scheduler 410 and iteratively applies modulo scheduling to IR 412 in a known manner to produce modulo schedule 522. Modulo scheduling may be an iterative process because, for reasons that will be evident to those skilled in the art, it is not generally assured that the first, or even subsequent, iterations will produce a modulo schedule with a repeating kernel. If a modulo schedule is not found, or if the number of iterations is deemed to be excessive, a simpler instruction schedule, such as a list schedule, may be used in accordance with known techniques. These contingencies are illustrated by line 504 of FIG. 5, indicating data flow from list scheduled IR 412 to SSA discarder 547. If either of these contingencies occur, control passes from modulo scheduler 520 to SSA discarder 547 (as shown by line 506), and rotating registers 107 generally are not assigned. For convenience, the occurrence of either of these contingencies (i.e., schedule not found, or iterations deemed excessive) may be referred to as situations in which it is "not advantageous" to produce a modulo schedule.

Moreover, there are other conditions under which it may be said to be "not advantageous" to generate a modulo schedule. Each modulo schedule has a characteristic that is commonly referred to as its initiation interval (II). The II is the interval, i.e., number of cycles, that is required to initiate a new iteration of the original loop. The II is also the number of cycles required to complete each iteration in the kernel using the modulo schedule. Typically, an initial II is chosen that is at least as great as the minimum II, described below. If a modulo schedule cannot be generated with this particular II (i.e., a repeating kernel is not produced), then the II is incremented and a fresh attempt at generating a new modulo schedule, with the incremented II, is made. For efficiency reasons, a so-called "maximum initiation interval" (max II) may be calculated with respect to list scheduled IR 412. The max II typically is set to the number of cycles required to complete each iteration in the kernel using just a list schedule, such as list scheduled IR 412. 1 f the max II of IR 412 is equal to or less than the II of the latest iteration of a tentative module schedule 522, then a modulo-scheduled IR that is generated using that tentative module schedule 522 generally will not execute any faster than list scheduled IR 412. Thus, in this contingency, SSA discarder 547, described below, operates upon list scheduled IR 412 instead of a modulo scheduled IR. This contingency is represented in FIG. 5 by data flow line 504 and control flow line 506. As noted, a minimum II may be calculated for a tentative modulo schedule using known techniques. The minimum II is the minimum number of cycles within which a modulo schedule may complete each iteration in the kernel. If the minimum II is equal to or greater than the max II, there also typically is no advantage to be gained from even attempting to find a modulo schedule.

Hereafter, for purposes of illustration, it is assumed that a modulo schedule 522 is generated; i.e., the circumstances are such that it is advantageous to generate a modulo schedule. In particular, it illustratively is assumed that minimum II is less than max II, and that a modulo schedule is found that has an II that is less than max II. This modulo schedule is then provided to modulo schedule code generator 545, described below.

Rotating Register Allocator 530. Scheduler-assigner 420 also includes rotating register allocator 530 that assumes control from modulo scheduler 520. Employing any known technique, or one to be developed in the future, rotating register allocator 530 identifies live ranges of loop-variant variables in modulo schedule 522. This identification may be accomplished, for example, by determining the first definition and last use of these variables. Allocator 530 determines which of these live ranges are most advantageously designated for allocation to rotating registers, as described below. Allocator 530 then allocates these live ranges to rotating registers, if available, in modulo schedule 522.

Allocator 530 also records these allocations in rotating register allocation designations 532. Designations 532 may be stored, made available, transferred, and otherwise processed in accordance with any of a variety of known techniques for processing data in computer 110, or other techniques to be developed in the future. Also, in some embodiments and in accordance with known or to-be-developed techniques, designations 532 may be derived from modulo schedule 522, or otherwise derived, when needed, rather than stored. For convenience, it hereafter will be said that allocator 530 "designates" rotating registers as being allocated to live ranges. It will be understood that this term is intended to include all of these techniques for processing data.

As described below, designations 532 is used by rotating register assigner 620 to allocate and assign rotating registers to an intermediate representation (IR 622). In contrast, it should be noted that the allocation of rotating registers by allocator 530 to modulo schedule 522 does not constitute the generation of an intermediate representation, but only the generation of a modulo schedule. This distinction is important because fewer resources (e.g., time and memory resources) generally are required in this context to generate a modulo schedule than to generate an intermediate representation.

As noted, rotating register allocator 530 determines which live ranges are most advantageously designated for allocation to rotating registers. In general, it is advantageous to designate variables with live ranges greater than II for allocation to rotating registers, as compared to variables with live ranges equal to or less than II. The reason is that if the lifetime of a loop-variant live range, i.e., variable, is less than or equal to II, computations involving that variable for one iteration will not be interfered with by computations involving the variable for a subsequent iteration due to register interference. That is, all computations involving the variable will be completed within the initiation interval, and, therefore, the register containing the value of the variable will not be overwritten by a subsequent iteration attempting to perform an operation using the same register for the same variable. Thus, these types of live ranges may be assigned to static registers 109; i.e., a variable V may be assigned to the same static register for the first, second, and subsequent iterations. In contrast, if a loop-variant live range has a lifetime greater than II, it generally cannot be assigned to a static register 109 unless software renaming is performed and time-consuming operations are added to ensure that the value of the variable during one iteration does not interfere with the value of the variable during a previous iteration. That is, the operations must ensure that different ones of static registers 109 are used for live ranges of the variable that are simultaneously live. As noted above, the particular design of rotating registers 107 avoids these problems.

In addition to being loop-variant, some live-ranges are "exposed" at entry to the loop. That is, "exposed" loop-variant live-ranges typically have a value flowing in from outside the loop at the entry, and another from within the loop from a previous iteration. An example of an exposed loop-variant live range is the live range for the variable representing the address of the array element a(i) in FIGS. 7D to 8 B; i.e., phi function 7D-5 of FIG. 7D, the phi function in slot #2 of cycle 8A-0 of FIG. 8A, and the phi function in slot #2 of cycle 8B-0 of FIG. 8B. This live range, after scheduling, is greater than 11 cycles, as one skilled in the art will note by examining the phi function in slot #2 of cycle 8B-0 of FIG. 8B. The live range is also exposed at the top of the loop because there is an initial value flowing into the loop. Thus, in accordance with SSA form, the phi function is used to join the multiple values.

In accordance with the present invention, all phi functions advantageously may be treated by allocator 530 as pure uses; that is, they temporarily are not considered to be a definition point for the relevant live ranges and thus are ignored for purposes of identifying the start of live ranges for rotating register allocation. The pure-use approach of the illustrated embodiment is advantageous because phi functions are not real machine instructions. They do not utilize machine resources and have no latencies. Alternatively, they could be considered as definitions and uses, that is, as real instructions defining new live ranges. However, this alternative approach would unnecessarily complicate the process of identifying live ranges because it would create new ones to identify.

With respect to all instructions other than those constituting phi functions, allocator 530 allocates rotating registers to modulo schedule 522 in accordance with any known method, or any method to be developed in the future. One known method is described in Rau, et al., supra. There may, or may not, be sufficient rotating registers to allocate to all loop-variant variables with live ranges greater than II. If there is not a sufficient number of rotating registers, allocator 530 returns control to modulo scheduler 520 so that it may increase the initiation interval and attempt to find a new modulo schedule. (This return of control is shown by line 502 of FIG. 5.) Although this new modulo schedule, if found, has a larger II (i.e., requires a greater number of cycles in which to execute the kernel) than the previous modulo schedule, the number of exposed live-ranges requiring rotating registers generally is reduced. Alternatively, allocator 530 could insert spill code and repeat the task of developing a modulo schedule for the same II. Typically, this process of finding a modulo schedule and determining whether there is a sufficient number of rotating registers to allocate to the modulo schedule is repeated until there are sufficient rotating registers for the modulo schedule, or a modulo schedule is not found within an acceptable number of iterations (i.e., max II is not greater than II), as described above with respect to scheduler 520.

This iterative procedure generally is advantageous because, even though II may be increased, execution time generally is reduced because of the efficiency of rotating registers in loops. In practice, it is not very often the case that there is a shortage of rotating registers. Therefore, it is not often the case that scheduler-assigner 420 must consume large amounts of compile time in an iterative process to find a modulo schedule compatible with the number of rotating registers available for allocation. Moreover, this iterative process generally is more advantageous than either of the two alternative approaches: (a) generating a modulo-scheduled intermediate representation and then having to insert unscheduled spill code, or, (b) in order to avoid inserting spill code, making potentially overly pessimistic assumptions about the number of rotating registers that are available.

Modulo Schedule Code Generator 545: Modulo schedule code generator 545 assumes control from rotating register allocator 530 and generates a modulo-scheduled, intermediate representation based on SSA form that includes rotating register assignments. Generator 545 carries out these functions by employing the information of modulo schedule 522 and rotating register allocation designations 532 to produce from IR 412 an SSA-updated IR 546. IR 546 thus embodies an efficient modulo schedule and rotating register allocation for loops while maintaining the same control and data-flow form (SSA-form in the illustrated embodiment) used by other components of optimizing compiler 100, such as global scheduler 410 or SSA discarder 547. This continuity of form provides the following advantages. First, an optimization algorithm (for example, global scheduling) may be applied to non-loop instructions whether or not loops are present in the dependence graph of the procedure. Therefore, more efficient code is generated for the procedure as a whole; i.e., for loop and non-loop instructions. Second, the data flow representation is the same both before and after the modulo scheduler has performed its task. Therefore, there is no loss in accuracy of information, or cost in terms of compile time or memory usage, due to changing between different data flow representations. The foregoing transformations are now described in greater detail with reference to FIG. 6, which is a functional block diagram of generator 545.

Figure 6:
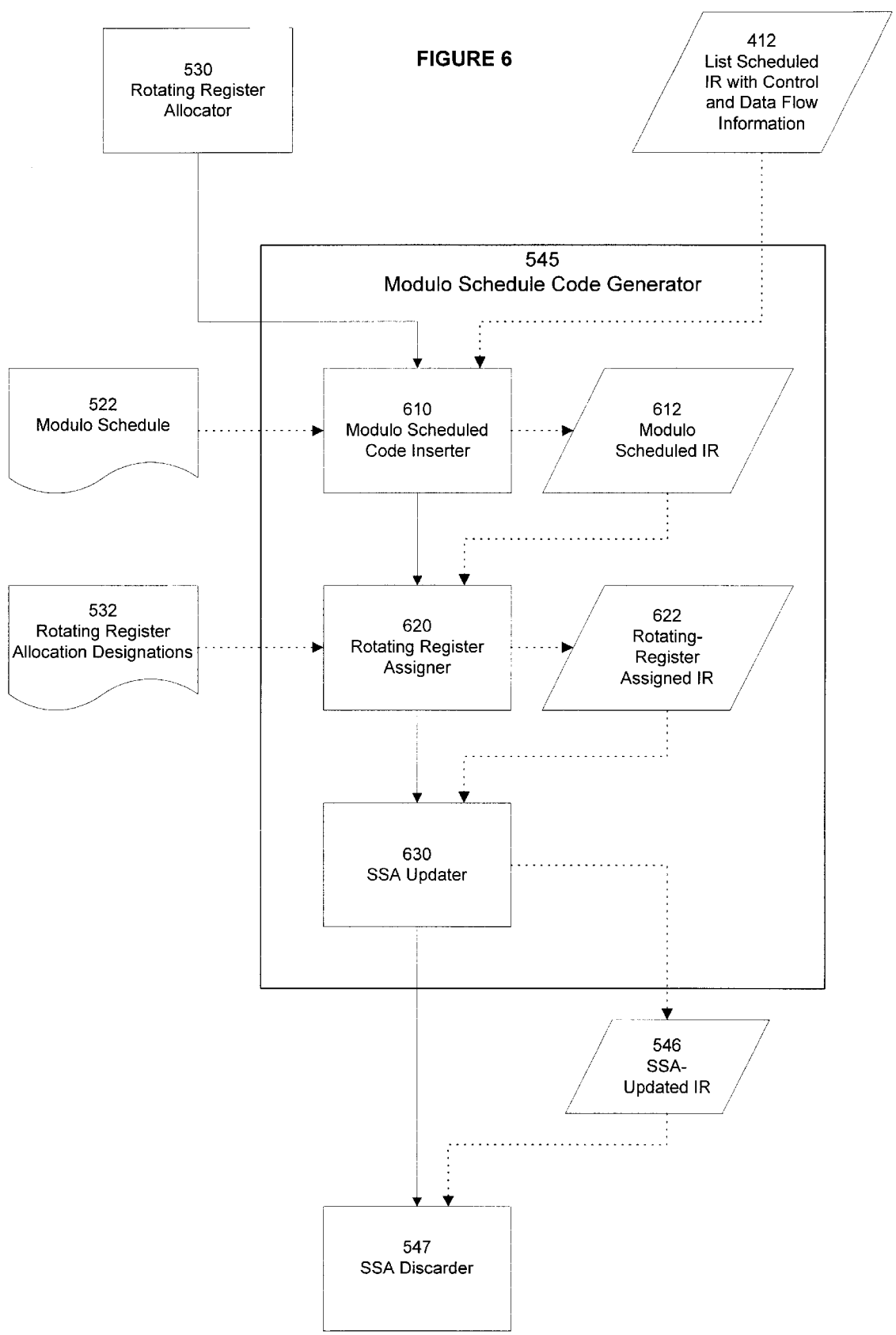
FIG. 6 is a functional block diagram of one embodiment of a modulo schedule code generator of the modulo scheduler and register allocator/assigner of FIG. 5.

Modulo Scheduled Code Inserter 610. As shown in FIG. 6, modulo schedule code generator 545 includes modulo scheduled code inserter 610. Inserter 610 applies modulo schedule 522 to IR 412 to pack instructions in a modulo-scheduled form, thus producing modulo scheduled IR 612. The modulo scheduled loop of IR 612 generally executes much faster than the list scheduled loop of IR 412. Also, by delaying code insertion (i.e., generation of an IR that is modulo scheduled) until after a schedule is found, an advantage is realized because it is not necessary to perform multiple updates of IR 412 before reaching the final modulo-scheduled form represented by IR 612. FIG. 8B is a representation of an illustrative example of the kernel of modulo scheduled IR 612 resulting from illustrative operations of modulo scheduled code inserter 610 on the fragment of IR 412 represented in FIG. 8A. As in FIG. 8A, the numbers in the left-most column of FIG. 8B represent machine cycle numbers (where cycle 8B-0 is an imaginary cycle) and are provided for convenience of reference only. The numbers in brackets in FIG. 8B correspond to the instruction numbers of FIG. 7D as transformed into IR 412 and shown in FIG. 8A. For convenience, the numbers in brackets will be identified hereafter simply in reference to the instructions of FIG. 7D. As may be noted by comparing FIGS. 8A and 8 B, more instructions are executed per machine cycle in the modulo-scheduled form of FIG. 8B than in the simple list schedule of FIG. 8A. Whereas five cycles are scheduled in IR 412 (not including the imaginary cycle used to represent the phi functions), only two are scheduled in IR 612.

Some instructions of IR 412 differ from the corresponding ones of IR 612 due to the use of predicate registers in the latter. For example, cycle 8B-1 of IR 612 includes instructions 2 and 6 of the kernel, both preceded by a reference to a rotating, virtual, predicate, register. These references are shown in FIG. 8B (and subsequent figures) by the symbols "<RVPR>". As described above, the use of predicate registers is one of a variety of known techniques to control whether an instruction is executed. Thus, in cycle 8B-1, RVPR1 (rotating, virtual, predicate, register number one) is allocated to enable instruction 7D-2 to be executed if the stage being executed for a particular instance of execution of the kernel is a particular stage, as determined in accordance with the modulo schedule. Similarly in cycle 8B-1, RVPR1 is allocated to enable instruction 7D-6 to be executed for the appropriate stage, and RVPR3 is allocated to enable instruction 7D-7 and 7D-9 to be executed for the appropriate stage. Cycle 8B-2 of the kernel is similarly constructed; that is, instructions 7D-3 and 7D-4 are executed for the appropriate stage. Instruction 7D-10, the jump to the top of the loop, is executed in cycle 8B-2 of the kernel. Phi function instructions 1, 5, and 8 are retained without change from IR 412. In particular, because the phi functions have been temporarily considered to be pure uses (as described above with reference to allocator 530), rotating registers have not been allocated to any of the phi functions in IR 612. Thus, static, virtual, general-purpose registers remain allocated to all targets and operands of these phi functions.

Rotating register assigner 620. Modulo schedule code generator 545 also includes rotating register assigner 620. Assigner 620 applies rotating register allocation designations 532 to IR 612 to produce rotating-register assigned IR 622. That is, assigner 620 assigns rotating, real, general-purpose registers (RRGR) to replace allocations of some static, virtual, general-purpose, registers (SVGR) in IR 612. Assigner 620 also assigns rotating, real, predicate, registers (RRPR) to the rotating, virtual, predicate, registers (RVPR) of IR 612. Advantageously, these assignments of rotating registers 107 to certain live ranges obviate the need to assign any of static register 109 to those live ranges. As noted, the resulting availability of additional static registers (as compared to those available using conventional techniques) for assignment reduces the need to spill static registers. Also, as noted, by delaying register assignment to the code generation phase (implemented by generator 545), as opposed to integrating it with the register allocation phase (implemented by allocator 530), it is not necessary to make multiple updates to IR 412 to produce modulo scheduled IR 612. This procedure is advantageous in the event that register allocation fails because there are not enough rotating registers.

In particular, assigner 620 assigns rotating, real, general-purpose registers to live ranges identified by allocator 530 and recorded for possible future allocation in rotating register allocation designations 532. As noted above with respect to the operation of allocator 530, examples of these live ranges are those having a lifetime (i.e., number of cycles in the range) greater than the initiation interval (II) of the modulo schedule. Advantageously, assigner 620 thus assigns live ranges to rotating registers 107 that, as described above, automatically are readdressed or re-identified for each iteration. For example, the real, rotating, general-purpose, register identified as RRGR6 in one iteration will be identified as RRGR5 in the next iteration. Alternatively stated, the contents of RRGR6 in one iteration will be the contents of RRGR5 in the next iteration. Therefore, a value may be stored in RRGR6 in one iteration and again stored in RRGR 6 in the subsequent iteration because the contents of the first iteration are preserved in RRGR5.

At this point, "exposed" live ranges that were allocated rotating registers are given particular attention. That is, the phi functions in which these live ranges are included are assigned registers in the following manner. The "targets" of the phi functions are, in the illustrated embodiments of the intermediate representations of FIGS. 7D to 8B, the left-hand side operands of the functions; i.e., to the left of the equal sign. These targets are assigned a rotating register (for example, RRGR1) that has been allocated for the live range associated with the respective phi function. The right-hand side operands represent the "exposed" values, or the values generated in the previous iteration, of the associated live range. The right-hand operands are therefore assigned a rotating register number that is one greater the number of the rotating register assigned to the target; for example, RRGR2. In accordance with the above-described design of rotating registers 107, RRGR2 thus has as its value in a particular iteration the value of RRGR1 during the previous iteration. By assigning phi functions in this manner, IR 622 is generated in a form that is convenient for updating by SSA updater 630, as described below.

In an alternative embodiment, assigner 620 need not assign real rotating registers to the phi functions. Rather, SSA updater 630 would make these assignments as it operated upon each phi function by propagating rotating registers to the uses of the target operands. This approach would advantageously be used, for example, if complex assignment algorithms were used, such as may be appropriate in instances in which phi functions define operands of other phi functions in the loop. Also, this alternative approach has the advantage of simplifying the assignment of rotating registers by making these assignments only with respect to instructions that are not phi functions.

FIG. 8C is a representation of an illustrative example of rotating-register assigned IR 622 resulting from rotating register assigner 620 applying rotating register assignments to the kernel shown in modulo scheduled IR 612. As shown in FIG. 8C, assigner 620 assigns rotating, real, general-purpose, registers (RRGR's) to the static, virtual, general-purpose, registers (SVGR's) of IR 612 representing exposed uses of loop-variant variables. For example, the phi function for the address of a(i), represented by instruction 5 in slot #2 of cycle 8C-0 of FIG. 8C, is changed by assigner 620 to substitute certain of rotating registers 107 for certain of static registers 109. In particular, static virtual registers SVGR22 and SVGR23 that hold phi function operands in instruction 5 of IR 612 (slot #2 of cycle 8B-0) are changed to the rotating register RRGR6, and the static virtual register SVGR21 that holds the phi function is changed to RRGR5. (As used in this context, "operands" are to the right of the equal sign, and the "target" of the operands is to the left of the equal sign.) These operands are assigned rotating registers because their live ranges are greater than II. Thus, it is assured that RRGR5 holds the current address of element a(i) irrespective of the control path taken to location L0. Because of the characteristic of rotating registers 107 described above, it is also assured that this live range will be preserved in RRGR6 during the subsequent iteration. In like manner, as will be evident to those skilled in the relevant art, assigner 620 assigns all other relevant live ranges to rotating registers. Also, assigner 620 assigns rotating, real, predicate, registers to the corresponding virtual registers of IR 612.

SSA updater 630. Modulo schedule code generator 545 also includes SSA updater 630 that assumes control from rotating register assigner 620 and operates upon IR 622 to produce SSA-updated IR 546. In particular, updater 630 identifies operands of phi functions that have been assigned rotating registers by assigner 620 as described above, and propagates those rotating registers to the uses of the operands. Updater 630 also eliminates phi functions having rotating registers assigned to operands that have been propagated. As mentioned above, updater 630 ensures that instructions in SSA-updated IR 546 are in valid SSA form. That is, it ensures that none of the remaining phi functions have real hardware register operands while relevant live ranges have been rotating register assigned. In valid SSA form, none of the phi operands are real registers. If live ranges that were assigned rotating registers were to include instructions with phi functions, then those phi functions could have real rotating registers assigned to their operands, and thus not be in valid form. It may also be noted that the separation of the update phase 630 from the assignment phase 620, although generally advantageous, is not necessary. This separation avoids the need for alternative implementations that generally are more complex and possibly error prone. For example, an alternative to separate update and assignment phases would be to implement an integrated assignment and updating function for updating assignments on the fly. That is, the integrated updater and assigner would eliminate the phi functions on the fly as assignments to rotating registers were being made.

The operations of updater 630 are evident from a comparison of IR 546 with IR 622, FIGS. 9A and 8C, respectively. For example, instruction [6] (slot #2 of cycle 8C-1) of IR 622 includes the addition of the contents of RRGR 5, i.e., the address of a(i), and the contents of SVGR24, i.e., the element size of array a. The result of this addition, i.e., the address of the next element of array a, is then stored in RRGR5. This use of the address of a(i) in instruction [6] of IR 622 is a use of an operand of the phi function of instruction [5] (slot #2 of cycle 8C-0 IR 622. In particular, the rotating register RRGR6 is an operand in the phi function of instruction [5], and is therefore propagated to its use in instruction [6] (thereby replacing the use of RRGR5 as an operand in instruction [6]). Thus, instruction [6] of SSA-updated IR 546 (slot #2 of cycle 9A-1) provides that, when the predicate register enables execution, the contents of RRGR6 are added to the contents of SVGR24 and placed in RRGR5.

During the propagation, updater 630 adjusts the rotating register number to account for "stage" differences between the schedule time of the phi function and of the use instruction. In the current example, there is no intervening stage boundary, and therefore RRGR 6 is used as it is without adjustments. Also, if there are other phi functions in the live range that use the target of a phi function, such as RRGR5, the propagation stops at the use of the phi function operands. The propagation is then continued when the use of the phi function is processed. Because all of the rotating registers assigned to operands of the phi function in slot #2 of cycle 8C-0 have been propagated to their uses (in this example, there is only one such propagation), updater 630 eliminates this propagated phi function. As may be noted by comparing FIGS. 8C and 9A, the phi function that appeared in slot #2 of cycle 8C-0 does not appear in SSA-updated IR 546 of FIG. 9A.

SSA Discarder 547. Scheduler-assigner 420 also includes SSA discarder 547 that eliminates data flow information from IR 546 to produce SSA-discarded IR 548. Specifically, SSA discarder 547 uses the so-called "sibling" relationship between SSA resource names to propagate static virtual register information to relevant operands. This procedure is well known to those skilled in the relevant art. When the propagation is completed, all operands that were siblings of each other have the same static virtual register name. Discarder 547 then eliminates all phi functions, thus eliminating the data flow information from SSA-updated IR 546 to produce SSA-discarded IR 548. The operations of updater 630 are evident from a comparison of IR 548 with IR 546, FIGS. 9B and 9 A, respectively. For example, instruction [2] (slot #1 of cycle 9A-1) of IR 546 includes the addition of the contents of SVGR17 with the contents of SVGR20. The result of this addition, when execution is enabled by RRPR1, is then stored in SVGR19. This use of SVGR19 is a use of an operand of the phi function of instruction [1] (slot #1 of cycle 9A-0 ) of IR 546. SVGR19 is therefore propagated to its use in instruction [2]. Thus, instruction [2] of SSA-discarded IR 548 (slot #1 of cycle 9B-1 ) provides that, when the predicate register enables execution, the contents of SVGR17 are added to the contents of SVGR20 and placed in SVGR17.

Static Register Assigner and Memory Spiller 550: Scheduler-assigner 420 also includes static register assigner and memory spiller 550. Assigner-spiller 550 assigns static, real, registers in IR 552 to all allocated static, virtual, registers that remain in SSA-discarded IR 548; i.e., those that have not been replaced by the assignment of their live ranges to rotating registers. This replacement is illustrated in FIG. 9C, which shows the portion of IR 552 corresponding to the portion of IR 548 shown in FIG. 9B. Thus, for example, SVGR17 and SVGR20 in instruction [2] of IR 548 (slot #1 of cycle 9B-1) are respectively replaced by SRGR1 and SRGR2 of instruction [2] of IR 552 (slot #1 of cycle 9C-1). In accordance with known techniques, assigner-spiller 550 also inserts instructions as required into IR 552 to spill static registers to memory if an insufficient number of static registers 109 are available.

Machine Code Generator 570. Modulo scheduler and register assigner 420 also includes machine code generator 570 that, in accordance with known techniques, transforms IR 552 into machine code, represented by optimized machine code 252, that can be directly executed by processor 105.

Having now described one embodiment of the present invention, it should be apparent to those skilled in the relevant art that the foregoing is illustrative only and not limiting, having been presented by way of example only. Many other schemes for distributing functions among the various functional elements of the illustrated embodiment are possible in accordance with the present invention. The functions of any element may be carried out in various ways in alternative embodiments. For example, numerous variations are contemplated in accordance with the present invention to schedule and/or optimize instructions, generate and represent data (and/or control) flow information; and generate and represent intermediate representations of source code. Functions ascribed to elements described above may be combined, in part or in whole, with functions of other elements. For example, the functions of scheduler 520 and allocator 530 may be combined with those of generator 545.

It will be understood that data generated by various functional elements (examples of which include control and data flow information 311, modulo schedule 522, and rotating register allocation designations 532) may be stored in accordance with any of a variety of known techniques for storing data. For example, the data may be stored in data structures (not shown) such as arrays or lists, in variables, and so on. The data structures may be located in memory unit 130, in another data storage device of computer 110, or in any other manner. Moreover, data need not be stored, but may be transferred or passed between functional elements in accordance with any of a variety of known techniques.

In addition, it will be understood by those skilled in the relevant art that control and data flows between and among functional elements of the invention and various intermediate representations may vary in many ways from the control and data flows described above. More particularly, intermediary functional elements (not shown) may direct control or data flows; the functions of various elements may be combined, divided, or otherwise rearranged to allow parallel processing or for other reasons; intervening intermediate representations and/or data structures may be used; various described data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. In a computer having one or more rotating registers and at least one memory unit having stored therein a first intermediate representation (first IR) of source code, a scheduler-assigner for allocating at least one of the one or more rotating registers, comprising:
   a software-pipelined instruction scheduler constructed and arranged to generate a first software-pipelined instruction schedule based on the first IR, the software-pipelined instruction scheduler is a modulo scheduler and the first software-pipelined instruction schedule is a modulo schedule; and
   a rotating register allocator constructed and arranged to designate a first live range of a loop-variant variable in the first software-pipelined instruction schedule as being allocated to a first rotating register, the rotating register allocator further is constructed and arranged to designate a second live range of a loop-variant variable in the first software-pipelined instruction schedule as being allocated to a second rotating register when available and, when not available, the software-pipelined instruction scheduler is further constructed and arranged to insert one or more spill code instructions in the first IR for the second live range, and to generate a second software-pipelined instruction schedule based on the first IR including the spill code instructions;
   wherein the first IR includes data flow information in SSA form.

2. The scheduler-assigner of claim 1, wherein:
   the first IR is a list scheduled IR.

3. The scheduler-assigner of claim 1, wherein:
   the software-pipelined instruction scheduler further is constructed and arranged to generate the software-pipelined instruction schedule only when it identifies a repeating kernel within a number of iterations of scheduling less than a threshold number representing an excessive number of iterations.

4. The scheduler-assigner of claim 1, wherein:
   the software-pipelined instruction scheduler further is constructed and arranged to generate the software-pipelined instruction schedule only when it determines that a minimum initiation interval of a tentative modulo schedule is less than a maximum initiation interval of the first IR.

5. The scheduler-assigner of claim 1, wherein:
   the first software-pipelined instruction schedule has an initiation interval; and
   the software-pipelined instruction scheduler is further constructed and arranged to generate the second software-pipelined instruction schedule having an initiation interval greater than the initiation interval of the first software-pipelined instruction schedule.

6. The scheduler-assigner of claim 5, wherein:
   when the second rotating register is not available, the rotating register allocator further is constructed and arranged to designate a third live range of a loop-variant variable in the second software-pipelined instruction schedule as being allocated to the first rotating register and to designate a fourth live range of a loop-variant variable in the second software-pipelined instruction schedule as being allocated to the second rotating register when available and, when not available, the software-pipelined instruction scheduler is further constructed and arranged to generate a third software-pipelined instruction schedule having an initiation interval greater than the initiation interval of the second software-pipelined instruction schedule.

7. The scheduler-assigner of claim 1, further comprising:
   a modulo schedule code generator constructed and arranged to generate, based on the first software-pipelined instruction schedule and the designation of the first live range as being allocated to the first rotating register, a rotating register assigned IR that includes an assignment of the first rotating register to the first live range.

8. The scheduler-assigner of claim 7, wherein:
   the modulo schedule code generator comprises
      a software-pipelined instruction-schedule code inserter constructed and arranged to generate from the first IR a software-pipelined IR having one or more instructions that are software-pipelined based on the first software-pipelined instruction schedule, and
      a rotating register assigner constructed and arranged to assign the first rotating register in the software-pipelined IR to the first live range, thereby generating a rotating-register assigned IR, wherein the assignment is based upon the designation of the first live range as being allocated to the first rotating register.

9. The scheduler-assigner of claim 8, wherein:
   the rotating-register assigned IR includes one or more phi functions including a first phi function having an operand to which the rotating register assigner has assigned the first rotating register, and
   the modulo schedule code generator further comprises
      an SSA updater constructed and arranged to propagate the first rotating register to at least one use of the operand, thereby generating a data-flow updated IR.

10. The scheduler-assigner of claim 9, wherein:
    when the first rotating register has been propagated to at least one use of the operand, the SSA updater is further constructed and arranged to remove the first phi function from the data-flow updated IR, thereby generating an SSA-updated IR.

11. The scheduler-assigner of claim 10, further comprising:
    an SSA discarder constructed and arranged to eliminate at least one data flow datum from the SSA-updated IR, thereby generating an SSA-discarded IR.

12. The scheduler-assigner of claim 11, wherein:
    the SSA discarder is constructed and arranged to eliminate the at least one data flow datum using a sibling relationship technique.

13. The scheduler-assigner of claim 11, wherein:
    the computer further includes one or more static registers;
    the SSA-discarded IR includes one or more static virtual registers; and
    the scheduler-assigner further comprises
       a static register assigner and memory spiller constructed and arranged to assign a first static register, when available, to replace a first of the one or more static virtual registers, thereby generating a static-register assigned IR.

14. The scheduler-assigner of claim 13, wherein:

when the first static register is not available, the static register assigner and memory spiller is further constructed and arranged to insert in the static-register assigned IR one or more spill code instructions for a live range corresponding to the first static virtual register.

15. The scheduler-assigner of claim 13, wherein:

the computer further includes a processor; and the scheduler-assigner further comprises a machine code generator constructed and arranged to transform the static-register assigned IR into a set of machine code instructions suitable for execution by the processor.

16. The scheduler-assigner of claim 1, wherein:

when the first live range is exposed, the rotating register allocator is further constructed and arranged to not designate any of the rotating registers as being allocated to the first live range.

17. A method for allocating at least one of one or more rotating registers in a computer, comprising:

(a) generating a first software-pipelined instruction schedule based on a first intermediate representation (first IR) of source code stored in a memory unit of the computer, the first software-pipelined instruction schedule is a modulo schedule; and (b) designating a first live range of a loop-variant variable in the first software-pipelined instruction schedule as being allocated to a first rotating register;

wherein the first IR includes data flow information in SSA form, wherein (b) comprises:

(i) designating a second live range of a loop-variant variable in the first software-pipelined instruction schedule as being allocated to a second rotating register when available, and (a) comprises:

(i) when the second rotating register is not available, inserting one or more spill code instructions in the first IR for the second live range, and (ii) generating a second software-pipelined instruction schedule based on the first IR including the spill code instructions.

18. The method of claim 17, wherein:

the first IR is a list scheduled IR.

19. The method of claim 17, wherein:

the first software-pipelined instruction schedule has an initiation interval; and (a) comprises (iii) when the second rotating register is not available, generating the second software-pipelined instruction schedule having an initiation interval greater that the initiation interval of the first software-pipelined instruction schedule.

20. The method of claim 19, wherein:

At when the second rotating register is not available, (b) comprises (ii) designating a third live range of a loop-variant variable in the second software-pipelined instruction schedule as being allocated to the first rotating register, and (iii) designating a forth live range of a loop-variant variable in the second software-pipelined instruction schedule as being allocated to the second rotating register when available, and (a) comprises (iv) when the second rotating register is not available for being allocated to the fourth live range, generating a third software-pipelined instruction schedule having an initiation interval greater than the initiation interval of the second software-pipelined instruction schedule.

21. The method of claim 17, further comprising:

(c) generating, based on the first software-pipelined instruction schedule and the designation of the first live range as being allocated to the first rotating register, a rotating register assigned IR that includes an assignment of the first rotating register to the first live range.

22. The method of claim 21, wherein:

(c) comprises (i) generating-from the first IR a software-pipelined IR having one or more instructions that are software-pipelined based on the first software-pipelined instruction schedule, and (ii) assigning the first rotating register in the software-pipelined IR to the first live range, thereby generating a rotating-register assigned IR, wherein the assignment is based upon the designation of the first live range as being allocated to the first rotating register.

23. The method of claim 22, wherein:

the rotating-register assigned IR includes one or more phi functions including a first phi function having an operand to which the first rotating register has been assigned, and (c) further comprises (iii) propagating the first rotating register to at least one use of the operand, thereby generating a data-flow updated IR.

24. The method of claim 23, wherein:

when the first rotating register has been propagated to at least one use of the operand, (c) (iii) further comprises removing the first phi function from the data-flow updated IR, thereby generating an SSA-updated IR.

25. The method of claim 24, further comprising:

(d) eliminating at least one data flow datum from the SSA-updated IR.

* * * * *